(12) United States Patent
Ikeda et al.

(10) Patent No.: US 9,817,520 B2
(45) Date of Patent: Nov. 14, 2017

(54) IMAGING PANEL AND IMAGING DEVICE

(71) Applicant: SEMICONDUCTOR ENERGY LABORATORY CO., LTD., Atsugi-shi, Kanagawa-ken (JP)

(72) Inventors: Takayuki Ikeda, Kanagawa (JP); Seiko Inoue, Kanagawa (JP); Hiroyuki Miyake, Kanagawa (JP); Kouhei Toyotaka, Kanagawa (JP); Takashi Nakagawa, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 225 days.

(21) Appl. No.: 14/273,677

(22) Filed: May 9, 2014

(65) Prior Publication Data
US 2014/0340363 A1   Nov. 20, 2014

(30) Foreign Application Priority Data

May 20, 2013   (JP) ................. 2013-106270

(51) Int. Cl.
*G06F 3/042* (2006.01)
*H01L 27/15* (2006.01)
*G06F 3/041* (2006.01)

(52) U.S. Cl.
CPC .......... *G06F 3/042* (2013.01); *G06F 3/0412* (2013.01); *G06F 3/0416* (2013.01); *G06F 2203/04102* (2013.01); *G06F 2203/04103* (2013.01)

(58) Field of Classification Search
CPC ...... G06F 3/042; G06F 3/0416; G06F 3/0412; G06F 2203/04103; G06F 2203/04102; H01L 27/153
See application file for complete search history.

(56) References Cited

U.S. PATENT DOCUMENTS

| 8,358,288 | B2* | 1/2013 | Kurihara ............. G02F 1/13338 345/156 |
| 8,502,772 | B2 | 8/2013 | Kozuma et al. |
| 8,502,902 | B2 | 8/2013 | Kurokawa et al. |
| 8,605,059 | B2 | 12/2013 | Kurokawa et al. |
| 8,633,051 | B2 | 1/2014 | Kurokawa et al. |
| 8,664,581 | B2 | 3/2014 | Kurokawa et al. |
| 2010/0156851 | A1 | 6/2010 | Kurokawa |
| 2011/0042766 | A1 | 2/2011 | Kurokawa et al. |
| 2011/0096009 | A1* | 4/2011 | Kurokawa ............ G06F 3/0412 345/173 |
| 2011/0109591 | A1 | 5/2011 | Kurokawa et al. |
| 2011/0205209 | A1 | 8/2011 | Kurokawa et al. |
| 2011/0221723 | A1 | 9/2011 | Kurokawa et al. |
| 2011/0310062 | A1 | 12/2011 | Ikeda et al. |

(Continued)

FOREIGN PATENT DOCUMENTS

JP      2012-033154 A      2/2012

*Primary Examiner* — Andrew Sasinowski
(74) *Attorney, Agent, or Firm* — Nixon Peabody LLP; Jeffrey L. Costellia

(57) ABSTRACT

A novel transmissive imaging panel, a novel imaging panel with a display function, or a novel imaging device is provided. The imaging panel that includes a plurality of windows or pixels arranged in matrix, a photoelectric conversion element extending between the plurality of windows or pixels, and a sensor circuit supplied with a signal from the photoelectric conversion element has been devised.

17 Claims, 17 Drawing Sheets

(56) References Cited

U.S. PATENT DOCUMENTS

| | | | |
|---|---|---|---|
| 2012/0162167 A1* | 6/2012 | Kurokawa | G06F 3/0412 |
| | | | 345/207 |
| 2013/0313412 A1 | 11/2013 | Kurokawa et al. | |
| 2013/0320333 A1 | 12/2013 | Koyama et al. | |
| 2014/0061654 A1* | 3/2014 | Yamazaki | H01L 27/1225 |
| | | | 257/59 |

* cited by examiner

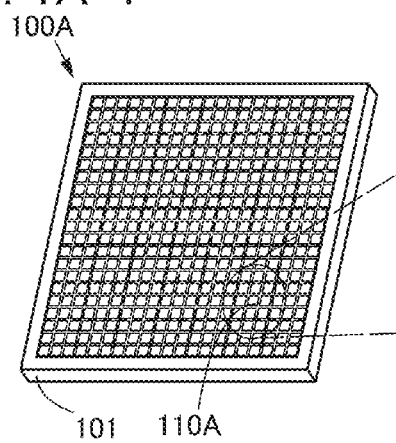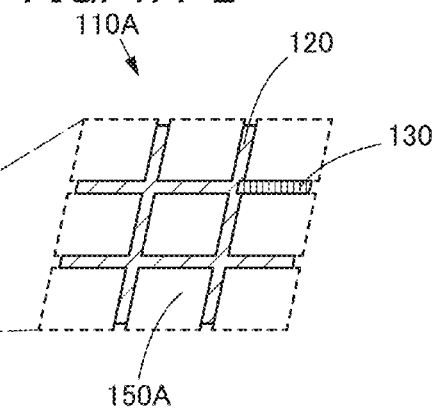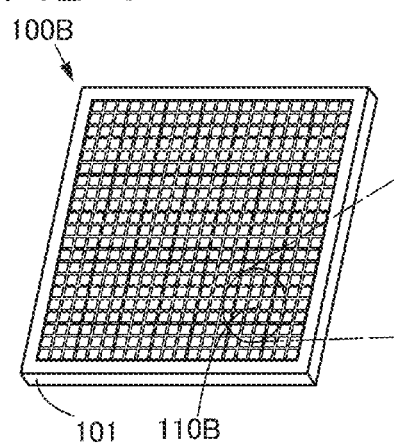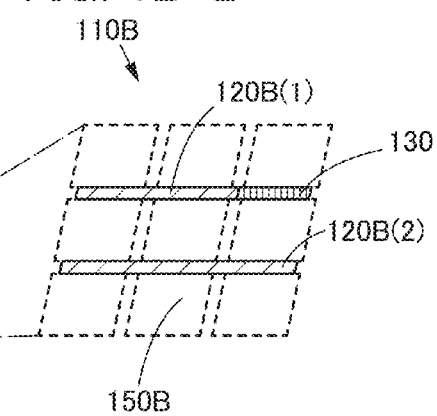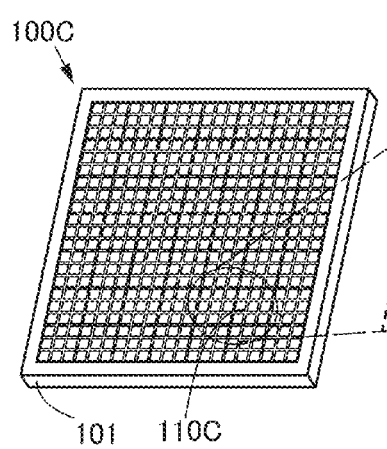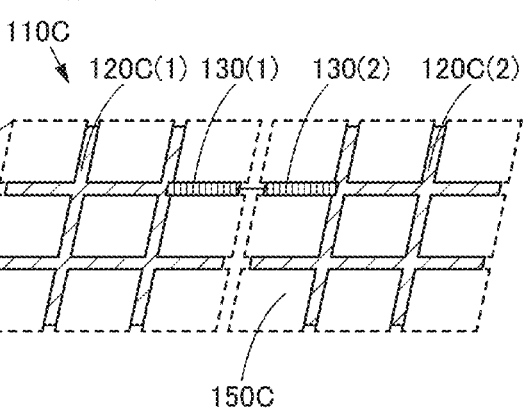

IMAGING PANEL AND IMAGING DEVICE

BACKGROUND OF THE INVENTION

1. Field of the Invention

The present invention relates to an object, a method, or a manufacturing method. In addition, the present invention relates to a process, a machine, manufacture, or a composition of matter. In particular, the present invention relates to, for example, a semiconductor device, a display device, a light-emitting device, a power storage device, a driving method thereof, or a manufacturing method thereof. In particular, the present invention relates to an imaging panel or an imaging device.

2. Description of the Related Art

Social infrastructures relating to means for transmitting information have advanced, which allows many pieces and various kinds of information to be obtained at and sent out from not only home or office but also visiting places.

In addition, portable information terminals are under development. Portable information terminals are often used outdoors; thus, for example, the portable information terminals are preferably capable of easily inputting information without the use of keyboards or the like.

Devices having a function of outputting information and a function of inputting information by incidence of light (such devices are also referred to as input/output devices) are known (Patent Document 1).

REFERENCE

Patent Document 1: Japanese Published Patent Application No. 2012-033154

SUMMARY OF THE INVENTION

It is an object of one embodiment of the present invention to provide a novel transmissive imaging panel. Alternatively, it is an object of one embodiment of the present invention to provide a novel imaging panel with a display function. Alternatively, it is an object of one embodiment of the present invention to provide a novel imaging device.

Note that the description of these objects does not disturb the existence of other objects. In one embodiment of the present invention, there is no need to achieve all the objects. Other objects will be apparent from and can be derived from the description of the specification, the drawings, the claims, and the like.

One embodiment of the present invention is an imaging panel that includes an insulating surface and a plurality of imaging pixels over the insulating surface. The imaging pixel includes a plurality of windows that are arranged in matrix and transmit visible light, a photoelectric conversion element that extends between the plurality of windows and supplies a signal, and a sensor circuit supplied with the signal.

One embodiment of the present invention is an imaging panel that includes an insulating surface and a plurality of imaging pixels over the insulating surface. The imaging pixel includes a plurality of windows that are arranged in matrix and transmit visible light, a plurality of photoelectric conversion elements that extend between the plurality of windows and supply signals, and one sensor circuit supplied with the plurality of signals.

One embodiment of the present invention is an imaging panel that includes an insulating surface and a plurality of imaging pixels over the insulating surface. The imaging pixel includes a plurality of windows that are arranged in matrix and transmit visible light, a plurality of photoelectric conversion elements that extend between the plurality of windows and supply signals, and a plurality of sensor circuits that are supplied with the signals and connected to each other in parallel.

The imaging panel according to one embodiment of the present invention includes a plurality of windows transmitting visible light and a photoelectric conversion element extending between the plurality of windows. Thus, the influence of the size or arrangement of the windows of the imaging pixels on the light-receiving area of the photoelectric conversion element can be reduced. In addition, the distribution of the intensity of light incident on the imaging panel can be sensed in each of the plurality of imaging pixels, and an object provided on one side of the imaging panel can be observed from the other side of the imaging panel through windows arranged with high density. As a result, it is possible to provide a novel transmissive imaging panel that has high noise resistance or hardly malfunctions.

One embodiment of the present invention is the imaging panel that includes a plurality of display pixels instead of the plurality of windows. The display pixel includes a display element and a display pixel circuit capable of supplying a signal to the display element.

The imaging panel according to one embodiment of the present invention includes a plurality of display pixels capable of displaying information and a photoelectric conversion element extending between the plurality of display pixels. Thus, the influence of the size or arrangement of the display pixels of the imaging pixels on the light-receiving area of the photoelectric conversion element can be reduced. In addition, the distribution of the intensity of light incident on the imaging panel can be sensed in each of the plurality of imaging pixels, and images can be displayed with high definition because of the imaging pixels. As a result, it is possible to provide a novel imaging panel with a high-definition display function that has high noise resistance or hardly malfunctions.

One embodiment of the present invention is an imaging device that includes the imaging panel including a first imaging pixel including a sensor circuit capable of supplying a first imaging signal and a second imaging pixel including a sensor circuit capable of supplying a second imaging signal, and a read circuit supplied with the first imaging signal and the second imaging signal. The read circuit includes a first amplifier capable of amplifying the first imaging signal to a first amplified signal and supplying the first amplified signal, a second amplifier capable of amplifying the second imaging signal to a second amplified signal and supplying the second amplified signal, and a selection circuit selecting and supplying one of the first amplified signal and the second amplified signal.

The imaging device according to one embodiment of the present invention includes an amplifier capable of amplifying an imaging signal supplied from the imaging pixel of the imaging panel and a selection circuit capable of selecting and supplying a plurality of amplified signals. Thus, the selection circuit can select an imaging pixel for reading a signal from a number of imaging pixels provided in a wide area of the imaging panel. For example, the half of a plurality of imaging signals supplied from a plurality of imaging pixels provided in a wide area can be read while the imaging signals are thinned out. Furthermore, a signal amplified by the amplifier can be supplied to the selection circuit. As a result, it is possible to provide a novel imaging device that can perform high-speed signal processing, has high noise resistance, or hardly malfunctions.

Note that a light-emitting device in this specification means an image display device or a light source (including a lighting device). The light-emitting device includes any of the following modules in its category: a module in which a connector such as a flexible printed circuit (FPC) or a tape carrier package (TCP) is attached to a light-emitting device; a module having a TCP provided with a printed wiring board at the end thereof; and a module having an integrated circuit (IC) directly mounted on a substrate over which a light-emitting element is formed by a chip on glass (COG) method.

Although the block diagram attached to this specification shows components classified according to their functions in independent blocks, it might be practically difficult to completely separate the components according to their functions, and one component might be involved in a plurality of functions.

The terms "source" and "drain" of a transistor in this specification interchange with each other depending on the polarity of the transistor or levels of potentials applied to terminals. In general, in an n-channel transistor, a terminal to which a low potential is applied is called a source, and a terminal to which a high potential is applied is called a drain. Furthermore, in a p-channel transistor, a terminal to which a low potential is applied is called a drain, and a terminal to which a high potential is applied is called a source. In this specification, although the connection relationship of the transistor is described assuming that the source and the drain are fixed in some cases for convenience, actually, the names of the source and the drain interchange with each other depending on the relationship of the potentials.

A source of a transistor in this specification means a source region that is part of a semiconductor film functioning as an active layer or a source electrode that is connected to the semiconductor film. Similarly, a drain of a transistor means a drain region that is part of a semiconductor film functioning as an active layer or a drain electrode that is connected to the semiconductor film. A gate means a gate electrode.

In this specification, a state in which transistors are connected to each other in series means, for example, a state in which only one of a source and a drain of a first transistor is connected to only one of a source and a drain of a second transistor. In addition, a state in which transistors are connected to each other in parallel means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state where current, voltage, or a potential can be supplied or transmitted. Accordingly, a connection state does not always mean a direct connection state but includes an indirect connection state through a circuit element such as a wiring, a resistor, a diode, or a transistor so that current, voltage, or a potential can be supplied or transmitted.

In this specification, even when independent components are connected to each other in a circuit diagram, there is the case where one conductive film has functions of a plurality of components, such as the case where part of a wiring functions as an electrode. The term "connection" in this specification also means such a case where one conductive film has functions of a plurality of components.

Furthermore, in this specification, one of a first electrode and a second electrode of a transistor refers to a source electrode, and the other of the first electrode and the second electrode of the transistor refers to a drain electrode.

According to one embodiment of the present invention, it is possible to provide a novel transmissive imaging panel. Alternatively, it is possible to provide a novel imaging panel with a display function. Alternatively, it is possible to provide a novel imaging device.

BRIEF DESCRIPTION OF THE DRAWINGS

In the accompanying drawings:

FIGS. 1A-1, 1A-2, 1B-1, 1B-2, 1C-1, and 1C-2 are schematic diagrams each illustrating an imaging panel structure according to an embodiment;

FIGS. 2A-1, 2A-2, 2B-1, and 2B-2 each illustrate a structure of an imaging panel with a display function according to an embodiment;

DETAILED DESCRIPTION OF THE INVENTION

Figures 1, 2A:
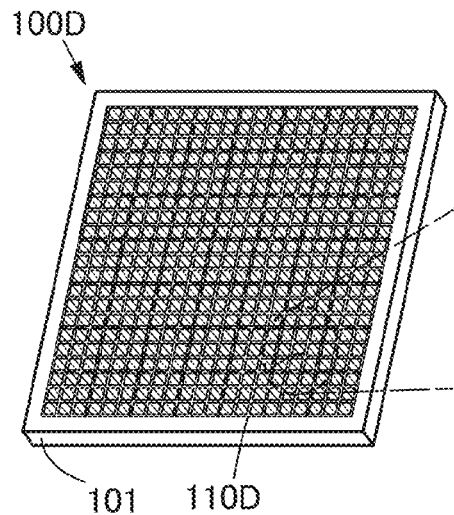

<Example of Problem Solvable by One Embodiment of the Present Invention>

Social infrastructures relating to means for transmitting information have advanced, which allows many pieces and various kinds of information to be obtained at and sent out from visiting places.

Consequently, portable information terminals need high functionality. Specifically, display devices need high definition.

In addition, portable information terminals are often used outdoors. Thus, it is preferable to employ an input method by which information can be input easily even with one hand or a limited number of fingers. For example, a touch panel is preferable.

With an increase in definition of a display device, it becomes difficult to provide a touch sensor of a touch panel between pixels when the distance between the pixels decreases. In addition, when a sensor element is made small to be provided in a narrow space between pixels, an output of the sensor element becomes small, so that the touch panel malfunctions easily or operates incorrectly.

<One Embodiment of the Present Invention>

The following embodiments include one embodiment of the present invention achieved by focusing the arrangement of sensor elements that is limited by windows, display elements, and the like arranged regularly.

An imaging panel according to one embodiment of the present invention includes a plurality of windows, pixels, and the like arranged in matrix, a photoelectric conversion element extending therebetween, and a sensor circuit supplied with a signal from the photoelectric conversion element.

With the use of the imaging panel according to one embodiment of the present invention, it is possible to provide a novel transmissive imaging panel. Alternatively, it is possible to provide a novel imaging panel with a display function. Alternatively, it is possible to provide a novel imaging device.

Embodiments will be described in detail with reference to the drawings. Note that the present invention is not limited to the following description, and it will be readily appreciated by those skilled in the art that modes and details of the present invention can be modified in various ways without departing from the spirit and scope of the present invention. The present invention therefore should not be construed as being limited to the following description of the embodiments. Note that in structures of the invention described below, the same portions or portions having similar functions are denoted by the same reference numerals in different drawings, and a description thereof is not repeated.

(Embodiment 1)

In this embodiment, structures of an imaging panel according to one embodiment of the present invention are described with reference to FIGS. 1A-1, 1A-2, 1B-1, 1B-2, 1C-1, and 1C-2 and FIGS. 2A-1, 2A-2, 2B-1, and 2B-2.

FIGS. 1A-1, 1B-1, and 1C-1 are schematic diagrams of the imaging panel according to one embodiment of the present invention, and FIGS. 1A-2, 1B-2, and 1C-2 are schematic diagrams illustrating structures of imaging pixels included in the imaging panel.

An imaging panel 100A in this embodiment (see FIGS. 1A-1 and 1A-2) includes an insulating surface of a substrate 101 and a plurality of imaging pixels 110A over the insulating surface. The imaging pixel 110A includes a plurality of windows 150A that are arranged in matrix and transmit visible light, a photoelectric conversion element 120 having a grid-like formation that extends between the plurality of windows 150A and supplies a signal, and a sensor circuit 130 supplied with the signal.

An imaging panel 100B in this embodiment (see FIGS. 1B-1 and 1B-2) includes an insulating surface of the substrate 101 and a plurality of imaging pixels 110B over the insulating surface. The imaging pixel 110B includes a plurality of windows 150B that are arranged in matrix and transmit visible light, a photoelectric conversion element 120B(1) and a photoelectric conversion element 120B(2) that extend between the plurality of windows 150B and supply signals, and the sensor circuit 130 supplied with the plurality of signals.

An imaging panel 100C in this embodiment (see FIGS. 1C-1 and 1C-2) includes an insulating surface of the substrate 101 and a plurality of imaging pixels 110C over the insulating surface. The imaging pixel 110C includes a plurality of windows 150C that are arranged in matrix and transmit visible light, a photoelectric conversion element 120C(1) and a photoelectric conversion element 120C(2) that extend between the plurality of windows 150C and supply signals, and a sensor circuit 130(1) and a sensor circuit 130(2) that are supplied with the signals and connected to each other in parallel.

The imaging panel 100A, the imaging panel 100B, and the imaging panel 100C in this embodiment each include a plurality of windows transmitting visible light and a photoelectric conversion element extending between the plurality of windows. Thus, the influence of the size or arrangement of the windows of the imaging pixels on the light-receiving area of the photoelectric conversion element can be reduced. In addition, the distribution of the intensity of light incident on the imaging panel can be sensed in every plurality of imaging pixels.

For example, when the windows are arranged on the insulating surface with high density, spaces between the windows become small. When the photoelectric conversion element is provided in each window, the light-receiving area becomes small or the opening area of the windows becomes small. However, when the photoelectric conversion element is provided to extend between the plurality of windows, the light-receiving area becomes large without a decrease in opening area of the windows.

In addition, an object provided on one side of the imaging panel can be observed from the other side of the imaging panel through the windows arranged with high density.

Figures 2, 2A:
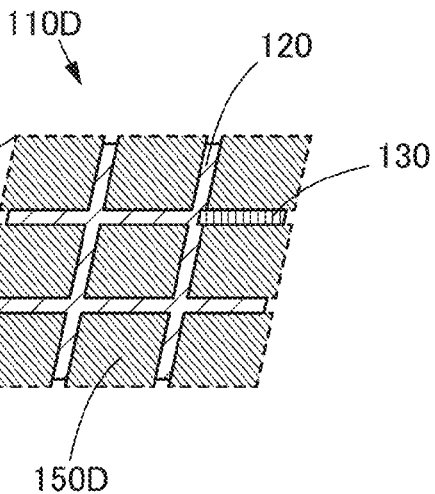
Figures 1, 2B:
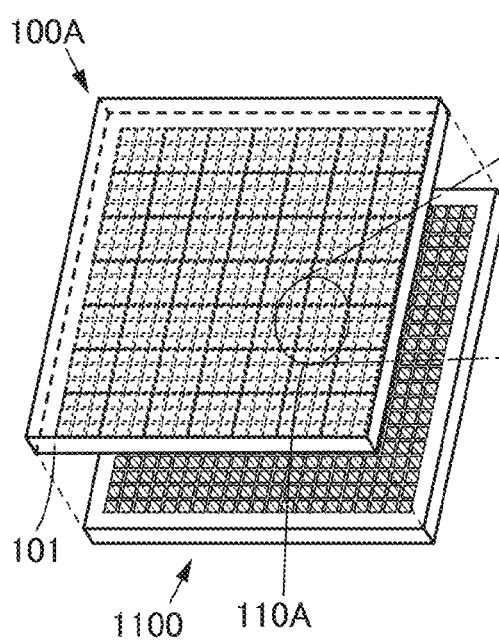
Figures 2, 2B:
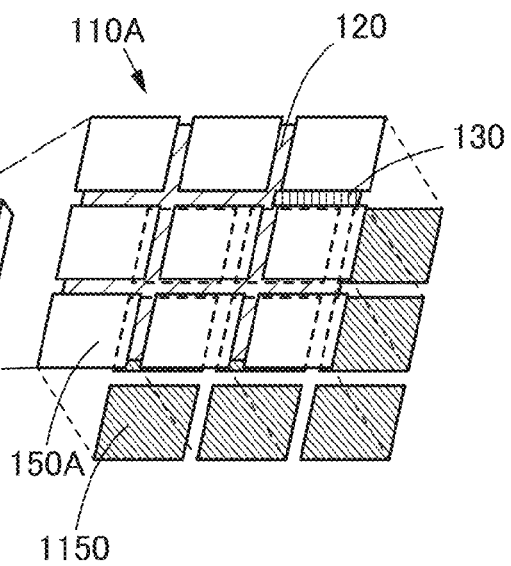

For example, the case where the imaging panel 100A overlaps a display panel 1100 is described with reference to FIGS. 2B-1 and 2B-2. Note that FIG. 2B-1 is a schematic diagram of the imaging panel 100A at the time when it overlaps the display panel 1100. FIG. 2B-2 is a schematic diagram illustrating the imaging pixel 110A included in the imaging panel 100A and a plurality of display pixels 1150 overlapping the imaging pixel 110A.

The imaging panel 100A includes the substrate 101 and the plurality of imaging pixels 110A provided over the insulating surface of the substrate 101 (see FIG. 2B-1). Note that the imaging panel 100A includes the imaging pixel 110A to sense light passing through the light-transmitting substrate 101.

The display panel 1100 includes the plurality of display pixels 1150. The display pixel 1150 includes a display element and a display pixel circuit for supplying a signal to the display element.

When the plurality of windows 150A that transmit visible light are arranged to overlap the display pixels 1150 of the display panel 1100, the imaging panel 100A can be used as a touch panel. In that case, it is not necessary to equalize the resolution of the imaging pixels to the definition of the display panel, and the imaging pixels can be arranged with lower density than that of the display pixels. Specifically, in the case where a finger or the like is sensed, the resolution of the imaging pixels can be lower than the definition of the display pixels.

As a result, it is possible to provide a novel transmissive imaging panel that has high noise resistance or hardly malfunctions. Alternatively, it is possible to provide a novel in-cell or on-cell touch panel that has high noise resistance or hardly malfunctions Components included in the imaging panel 100A according to one embodiment of the present invention are described below (see FIGS. 1A-1 and 1A-2).

<Substrate>

There is no particular limitation on a substrate that can be used as the substrate 101 as long as it has heat resistance high enough to withstand temperatures in manufacturing steps, has thickness and size that are applicable to manufacturing equipment, and prevents diffusion of an unintentional impurity into a functional element.

Applicable substrate structures are a single-layer structure, a layered structure, and a composite structure including a fibrous or particulate material. For example, a film-like structure with a thickness of greater than or equal to 1 μm and less than 200 μm and a plate-like structure with a thickness of greater than or equal to 0.1 mm can be used.

The substrate can be selected depending on a difference in linear expansion coefficient with a stacked layer, heat applied in manufacturing steps, and the allowable curl. Specifically, it is preferable to use a substrate whose linear expansion coefficient is lower than or equal to $1 \times 10^{-3}$/K, preferably lower than or equal to $5 \times 10^{-5}$/K, and more preferably lower than or equal to $1 \times 10^{-5}$/K.

Examples of materials that can be used for the substrate include glass, ceramics, metal, an inorganic material, and a resin.

Specifically, non-alkali glass, soda-lime glass, potash glass, crystal glass, or the like can be used as glass.

As metal, SUS, aluminum, or the like can be used. Note that by forming an insulating film over a metal surface, the metal surface can be insulated.

As an inorganic film, for example, a metal oxide film, a metal nitride film, a metal oxynitride film, or the like can be used. Specifically, silicon oxide, silicon nitride, silicon oxynitride, an alumina film, or the like can be used.

As the resin, polyester, polyolefin, polyamide, polyimide, polycarbonate, an acrylic resin, or the like can be used.

<Imaging Pixel>

The imaging pixel 110A includes the photoelectric conversion element 120 and the sensor circuit 130 supplied with a signal from the photoelectric conversion element 120.

The photoelectric conversion element 120 can be, for example, a photodiode.

As the sensor circuit 130, an amplifier for amplifying a signal supplied from the photoelectric conversion element 120 can be used. Note that a selection circuit can be provided in the sensor circuit 130. Thus, one imaging pixel 110A can be selected from a plurality of imaging pixels 110A provided in the imaging panel 100A.

Note that structure examples of the imaging pixel 110A that can be used in the imaging panel 100A are described in detail in Embodiment 2.

MODIFICATION EXAMPLE 1

A modification example of the imaging panel in this embodiment is described with reference to FIGS. 2A-1, 2A-2, 2B-1, and 2B-2.

FIG. 2A-1 is a schematic diagram of an imaging panel with a display function according to one embodiment of the present invention. FIG. 2A-2 is a schematic diagram illustrating the structure of an imaging pixel included in the imaging panel.

An imaging panel 100D with a display function illustrated in the modification example of this embodiment differs from the imaging panel 100A described with reference to FIGS. 1A-1 and 1A-2 in that a plurality of display pixels 150D are provided instead of the plurality of windows 150A.

The imaging panel 100D illustrated in the modification example of this embodiment includes the plurality of display pixels 150D instead of the plurality of windows 150A. The display pixel 150D includes a display element and a display pixel circuit that can supply a signal to the display element.

Thus, the influence of the size or arrangement of the display pixels 150D on the light-receiving area of the photoelectric conversion element 120 can be reduced. For example, by arranging the display pixels 150D over the insulating surface of the substrate 101 with high density, even when spaces between the display pixels 150D become small, the light-receiving area of the photoelectric conversion element 120 can be increased by extending the photoelectric conversion element 120 between the plurality of display pixels 150D to increase the length of the photoelectric conversion element 120.

The use of the large photoelectric conversion element 120 enables sensing the distribution of light incident on the imaging panel 100D with a display function in each of the plurality of imaging pixels 110D provided over the insulating surface of the substrate 101. For example, it is not necessary to equalize the resolution of the imaging pixels 110D to the definition of the display pixels 150D, and the imaging pixels 110D can be arranged with lower density than that of the display pixels 150D.

Specifically, in the case where a finger or the like is sensed, the resolution of the imaging pixels 110D can be lower than the definition of the display pixels 150D. In addition, images can be displayed with high definition because of the imaging pixels 110D.

As a result, it is possible to provide a novel imaging panel with a high-definition display function that has high noise resistance or hardly malfunctions.

Components included in the imaging panel 100D with a display function according to one embodiment of the present invention are described below.

<Display Pixel>

The display pixel 150D includes a display element and a pixel circuit for driving the display element.

Examples of a display element that can be used in the display pixel 150D include known display elements such as a liquid crystal element, an organic electroluminescent element, electronic ink, a MEMS shutter display element, and a MEMS optical coherence display element.

A pixel circuit structure suitable for display elements to be used can be selected from known pixel circuit structures.

Note that this embodiment can be combined with any of the other embodiments in this specification as appropriate.

(Embodiment 2)

In this embodiment, structures of an imaging pixel that can be used in an imaging panel according to one embodiment of the present invention are described with reference to FIGS. 3A and 3B and FIG. 4.

Figure 3A:
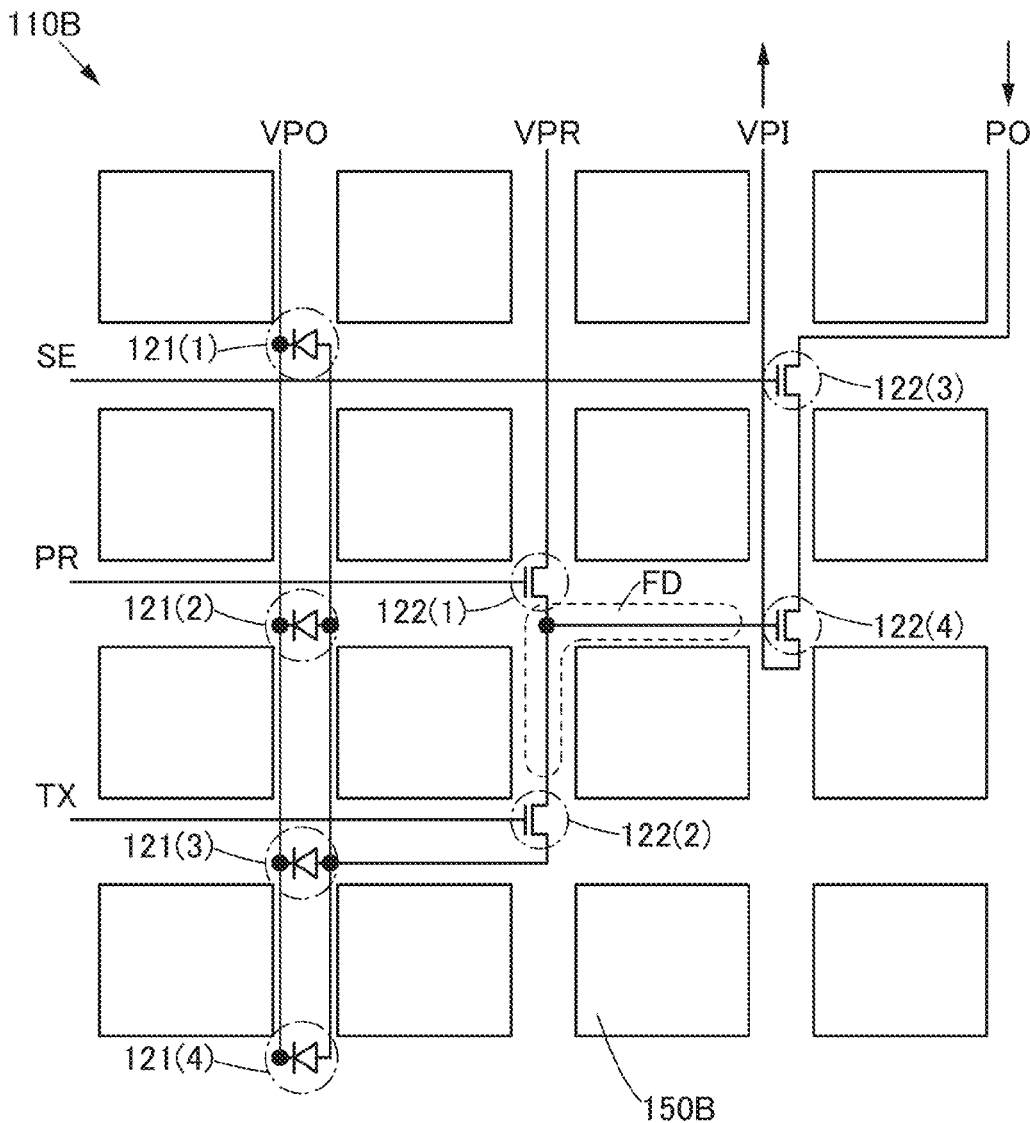
FIGS. 3A and 3B illustrate an imaging pixel structure according to an embodiment.

FIG. 3A is a top view of the imaging pixel 110B on which its circuit diagram is overlaid. FIG. 3B is a schematic diagram illustrating the structure of the display pixel 150D that can be provided instead of the window 150B capable of transmitting visible light in FIG. 3A. Note that the display pixel 150D includes three subpixels.

The imaging pixel 110B in this embodiment includes the plurality of windows 150B arranged in a matrix of four rows and four columns, photoelectric conversion elements 121(1)

to 121(4) that extend along the windows 150B arranged in the row direction and are arranged in the column direction of the windows 150B, and a sensor circuit supplied with signals from the photoelectric conversion elements (see FIG. 3A).

Note that the photoelectric conversion elements 121(1) to 121(4) connected to each other in parallel, and one electrode of each of the photoelectric conversion elements 121(1) to 121(4) is electrically connected to a wiring VPO that can supply current. In addition, the other electrode of each of the photoelectric conversion elements 121(1) to 121(4) is electrically connected to a second electrode of a transistor 122(2) in the sensor circuit.

The sensor circuit includes a transistor 122(1), the transistor 122(2), a transistor 122(3), and a transistor 122(4). A gate of the transistor 122(1) is electrically connected to a wiring PR. A first electrode of the transistor 122(1) is electrically connected to a wiring VPR. A gate of the transistor 122(2) is electrically connected to a wiring TX. A first electrode of the transistor 122(2) is electrically connected to a second electrode of the transistor 122(1). The second electrode of the transistor 122(2) is electrically connected to the other electrode of each of the photoelectric conversion elements 121(1) to 121(4). A gate of the transistor 122(3) is electrically connected to a wiring SE. A first electrode of the transistor 122(3) is electrically connected to a wiring PO. A gate of the transistor 122(4) is electrically connected to the first electrode of the transistor 122(2). A first electrode of the transistor 122(4) is electrically connected to a second electrode of the transistor 122(3). A second electrode of the transistor 122(4) is electrically connected to a wiring WI.

Components included in an imaging pixel that can be used in an imaging panel according to one embodiment of the present invention are described below.

<Region>

In the case where an imaging panel including the imaging pixel 110B overlaps a display panel, the windows 150B are arranged almost uniformly. When the windows 150B are not arranged uniformly, display pixels overlapping the windows 150B are not arranged uniformly; thus, display quality is decreased.

When the windows 150B are arranged with a definition of greater than or equal to 200 ppi, preferably greater than or equal to 350 ppi, more preferably greater than or equal to 600 ppi, high-quality images can be displayed. Note that ppi (pixel per inch) is a unit indicating the number of pixels per inch. For example, in the case where three subpixels form one pixel, the three subpixels are regarded as one repeating unit.

Furthermore, when the imaging pixels are arranged with a definition of greater than or equal to 5 ppi, preferably greater than or equal to 10 ppi, more preferably greater than or equal to 100 ppi, the imaging panel is suitable for a touch panel.

<Photoelectric Conversion Element>

As each of the photoelectric conversion elements 121(1) to 121(4), a photodiode can be used, for example. Specifically, a photodiode including a silicon semiconductor layer can be used. In particular, a photodiode in which p-type amorphous silicon, i-type amorphous silicon, and n-type amorphous silicon are stacked can be used favorably.

<Sensor Circuit>

The sensor circuit can be formed using a transistor or the like.

As a transistor that can be used for the sensor circuit, for example, it is possible to use a transistor including a channel in a single crystal, polycrystalline, or amorphous semiconductor layer. Alternatively, it is possible to use a transistor including a channel in a semiconductor layer that contains an element that belongs to Group 14 of the periodic table (e.g., Si, Ge, or SiC), a compound (e.g., GaAs or GaP), or an oxide (e.g., an oxide containing In, Ga, or Zn). Alternatively, it is possible to use a transistor including a channel in a layer of a semiconductor (e.g., an oxide semiconductor) whose bandgap is wider than that of silicon.

In particular, a sensor circuit that includes a transistor with low off-state current as each of the transistor 122(1) and the transistor 122(2) is unlikely to reduce the amount of electric charge based on the amount of light exposure that is stored in a storage node FD. Thus, it is possible to drive the imaging panel by a global shutter method.

Note that by the global shutter method, a plurality of imaging pixels (all the imaging pixels at the maximum) provided in the imaging panel can be exposed to light at the same time. This results in distortion-free images.

<Method for Driving Sensor Circuit>

Figure 3B:
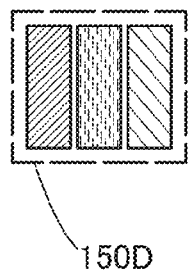

The sensor circuit in FIGS. 3A and 3B can be driven by the following steps.

Although an example of a method for driving a sensor circuit including n-channel transistors is described here, this embodiment is not limited thereto.

A sufficiently high potential is supplied to the wiring VPO, and a sufficiently low potential is supplied to each of the wiring VPR and the wiring VPI.

In a first step, a high-level signal is supplied to each of the wiring TX and the wiring PR. Thus, the transistor 122(1) and the transistor 122(2) are turned on. Consequently, the potential of the node FD is set in accordance with the potential of the wiring VPR.

In a second step, a low-level signal is supplied to each of the wiring SE and the wiring PR, and a high-level signal is supplied to the wiring TX. Thus, the transistor 122(3) and the transistor 122(1) are turned off, and the transistor 122(2) is turned on. At this time, the photoelectric conversion elements 121(1) to 121(4) exposed to light supplies current based on the intensity of the light to the node FD.

In a third step, a low-level signal is supplied to each of the wiring SE, the wiring PR, and the wiring TX. Thus, the transistor 122(3), the transistor 122(2), and the transistor 122(1) are turned off. Consequently, the potential of the node FD is set in accordance with the amount of light delivered to the imaging pixel 110B in the second step.

In a fourth step, a high-level signal is supplied to the wiring SE, and a low-level signal is supplied to each of the wiring PR and the wiring TX. Thus, the transistor 122(3) is turned on, and the transistor 122(1) and the transistor 122(2) are turned off. Consequently, the potential of the node FD is set in accordance with current flowing between the first electrode and the second electrode of the transistor 122(4).

In a fifth step, an unillustrated read circuit reads the current flowing through the transistor 122(4). Thus, the light delivered to the imaging pixel 110B in the second step can be sensed.

In a sixth step, the driving of the sensor circuit is terminated. Note that it is possible to return the step to the first step and drive the sensor circuit repeatedly.

MODIFICATION EXAMPLE 1

A modification example of the imaging pixel in this embodiment is described with reference to FIG. 4.

Figure 4:
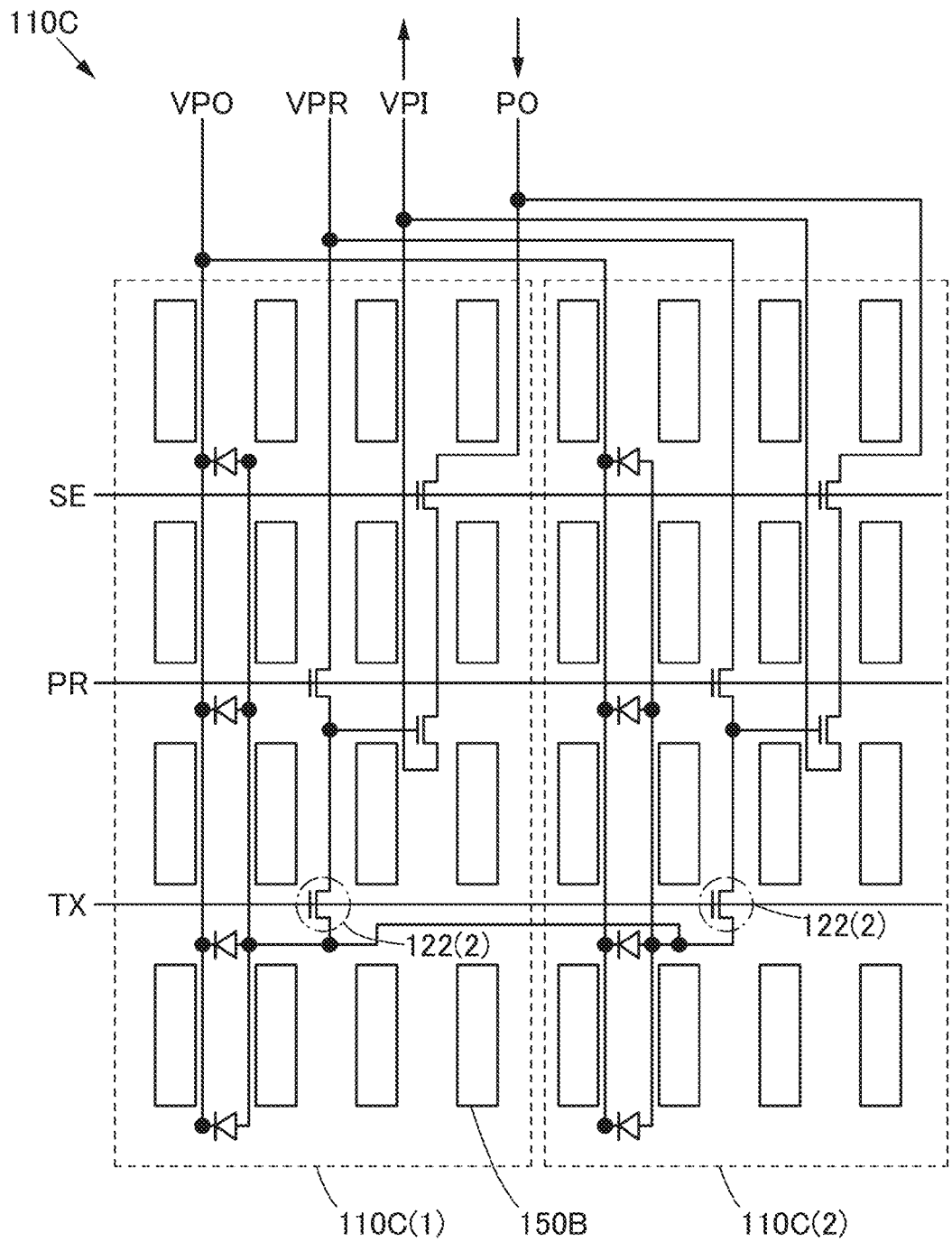
FIG. 4 illustrates an imaging pixel structure according to an embodiment.

FIG. 4 is a top view illustrating a modification example of an imaging pixel on which its circuit diagram is overlaid.

The imaging pixel 110C illustrated in the modification example of this embodiment differs from the imaging pixel described with reference to FIGS. 3A and 3B in that two circuits of the imaging pixels described with reference to FIGS. 3A and 3B are provided and connected to each other in parallel. Thus, differences are described in detail below, and the description made with reference to FIGS. 3A and 3B is referred to for similar portions.

The imaging pixel 110C illustrated in the modification example of this embodiment includes an imaging portion 110C(1) and an imaging portion 110C(2). Each of the imaging portion 110C(1) and the imaging portion 110C(2) includes the plurality of windows 150B arranged in a matrix of four rows and four columns.

Each of the imaging portion 110C(1) and the imaging portion 110C(2) includes four photoelectric conversion elements. The total eight photoelectric conversion elements are connected to each other in parallel. Note that one terminal of each of the eight photoelectric conversion elements is electrically connected to the wiring VPO.

Each of the imaging portion 110C(1) and the imaging portion 110C(2) further includes a sensor circuit. The other terminal of each of the photoelectric conversion elements connected to each other in parallel is electrically connected to the second electrode of the transistor 122(2) in the sensor circuit.

Furthermore, each of the imaging portion 110C(1) and the imaging portion 110C(2) is electrically connected to the wiring PR, the wiring VPR, the wiring TX, the wiring SE, the wiring PO, and the wiring WI.

Note that this embodiment can be combined with any of the other embodiments in this specification as appropriate.

(Embodiment 3)

In this embodiment, structures of the imaging pixel 110D that can be used in the imaging panel 100D with a display function according to one embodiment of the present invention are described with reference to FIG. 5, FIG. 6, and FIG. 7. Specifically, structure examples of the imaging pixel 110D that can be used in the imaging panel with a display function described with reference to FIG. 2A-1 in Embodiment 1 are described.

Figure 5:
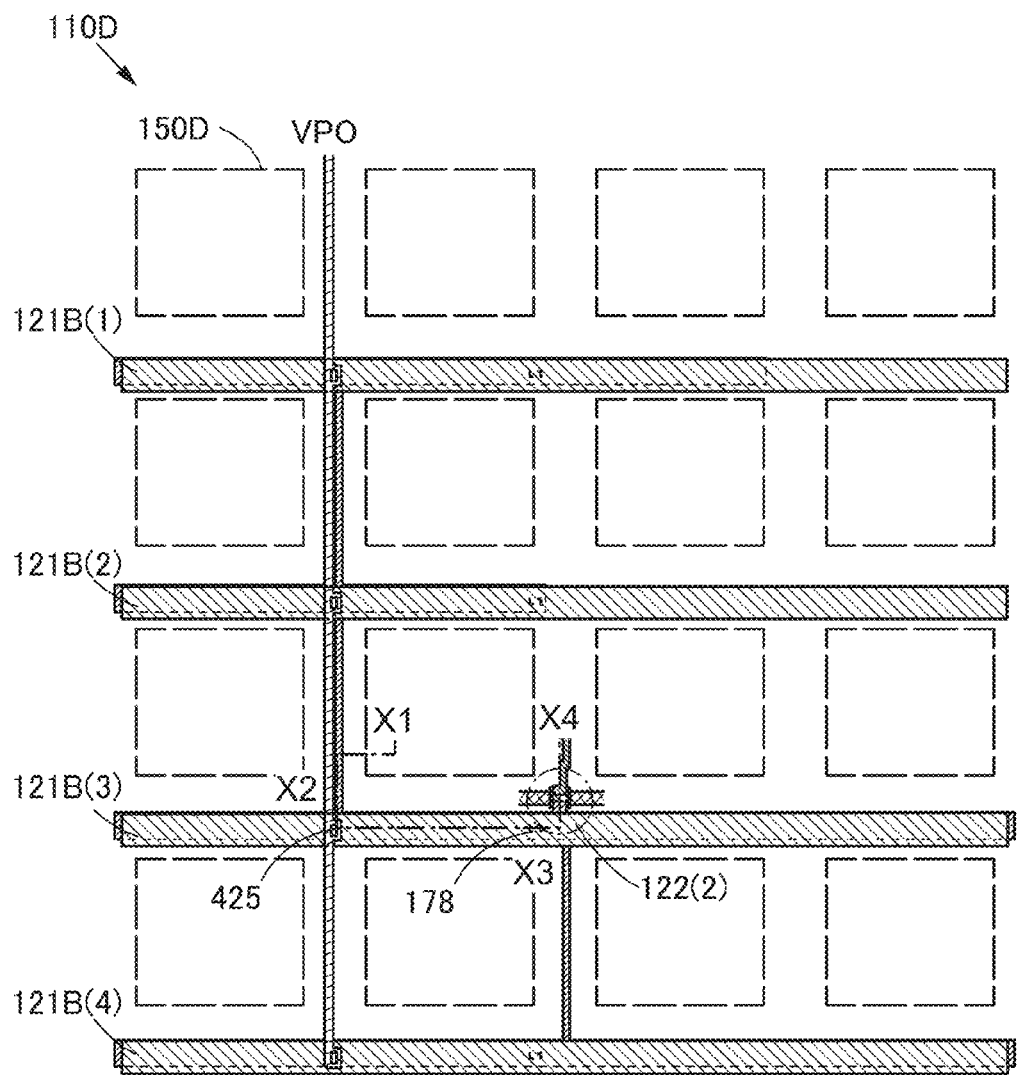
FIG. 5 illustrates a structure of a photoelectric conversion element that can be used in an imaging pixel according to an embodiment.
Figure 6:
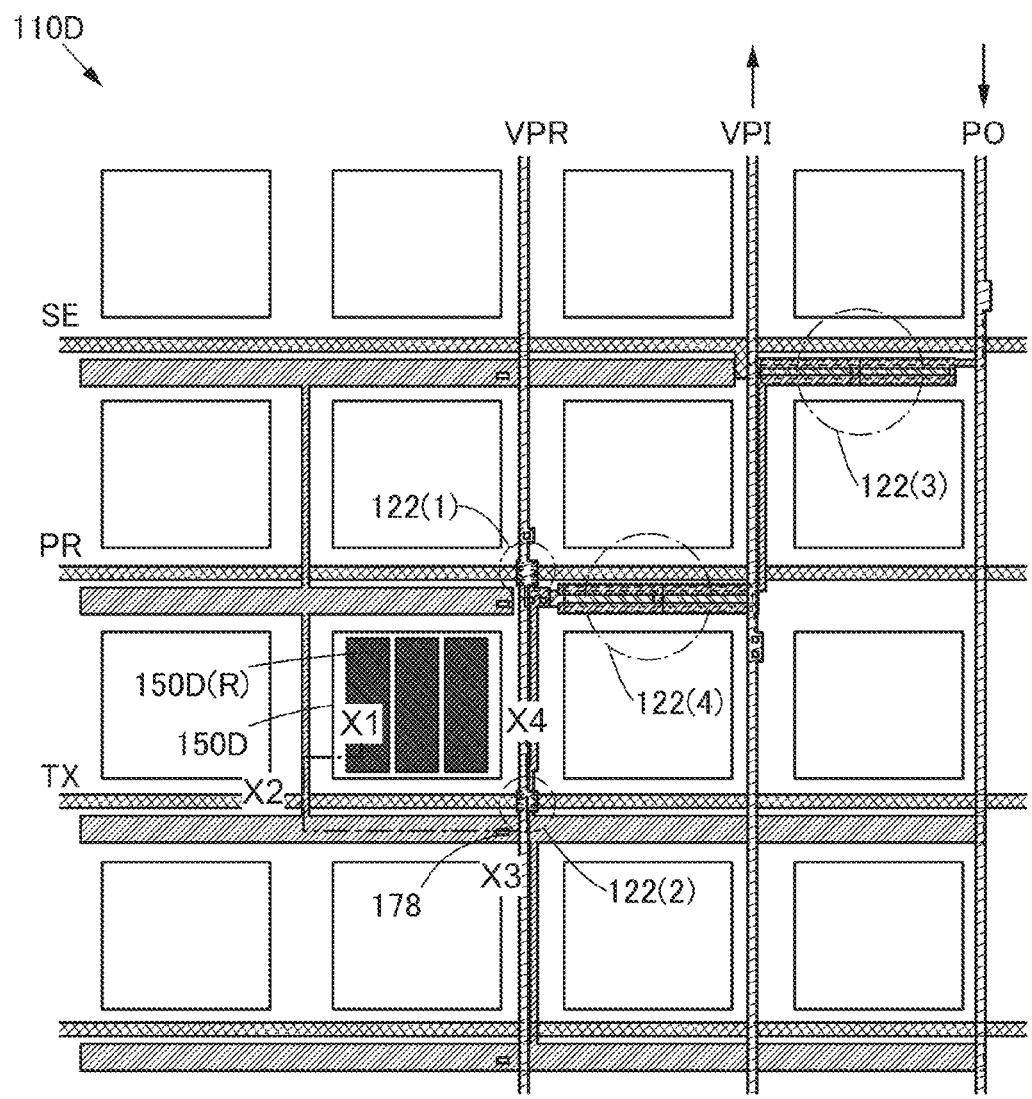
FIG. 6 illustrates a structure of a sensor circuit that can be used in an imaging pixel according to an embodiment.

FIG. 5 and FIG. 6 are top views of the imaging pixel 110D. Specifically, FIG. 5 is a top view illustrating the arrangement of photoelectric conversion elements 121B(1) to 121B(4) connected to each other in parallel. FIG. 6 is a top view illustrating the location of a sensor circuit for sensing signals supplied from the photoelectric conversion elements in FIG. 5. The photoelectric conversion elements in FIG. 5 are stacked on the sensor circuit in FIG. 6.

For clarity, FIG. 5 illustrates the display pixels 150D represented by rectangular shapes using broken lines. Note that FIG. 6 illustrates one display pixel 150D that includes three subpixels (including a subpixel 150D(R)).

Figure 7:
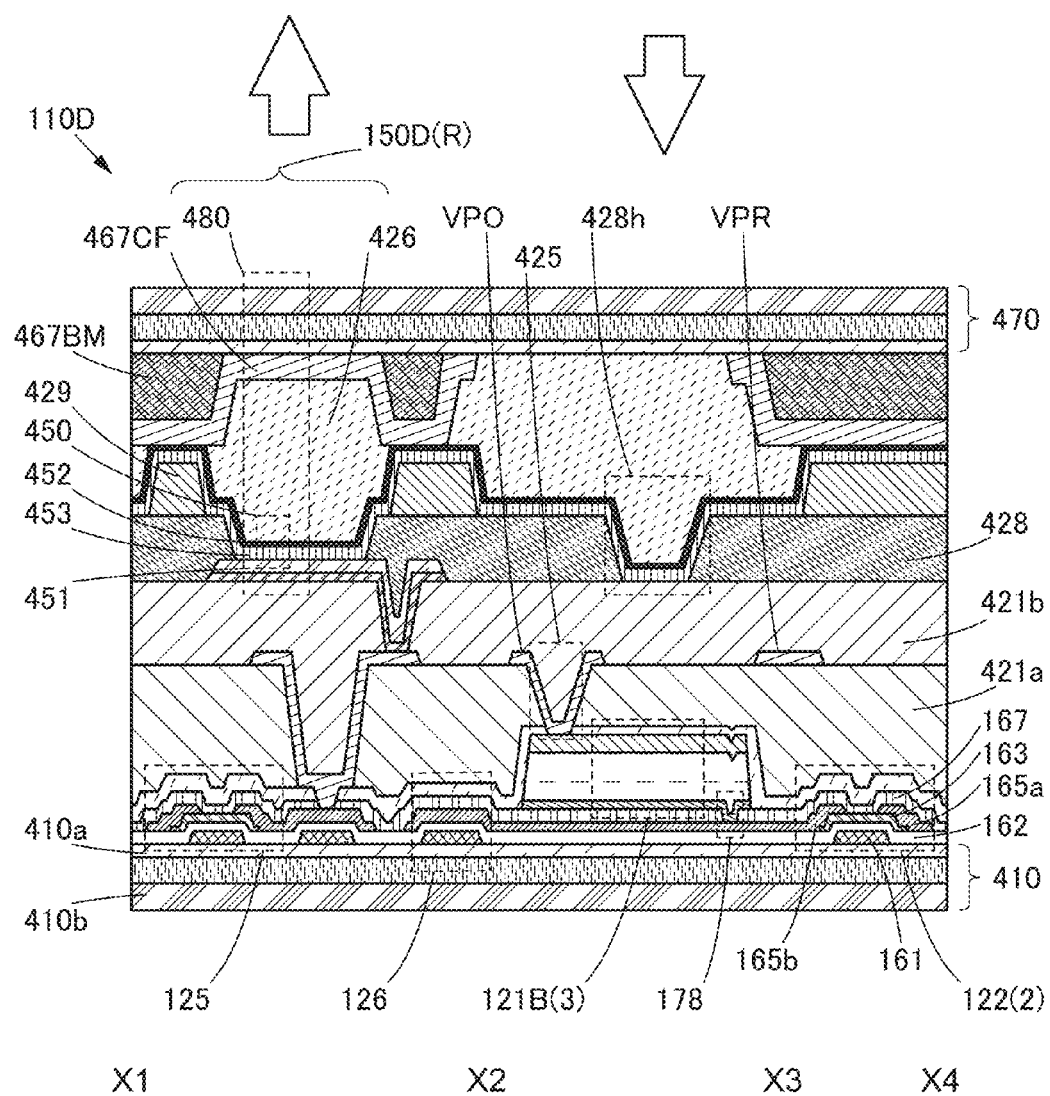
FIG. 7 is a cross-sectional view illustrating an imaging device according to an embodiment.

FIG. 7 is a cross-sectional view taken along section line X1-X2-X3-X4 in FIG. 6.

<Arrangement of Photoelectric Conversion Element>

The imaging pixel 110D includes the plurality of display pixels 150D arranged in a matrix of four rows and four columns and the photoelectric conversion elements 121B(1) to 121B(4) connected to each other in parallel (see FIG. 5). The photoelectric conversion elements 121B(1) to 121B(4) extend along the display pixels 150D arranged in the row direction and are arranged in the column direction of the display pixels 150D.

One electrode of the photoelectric conversion element 121B(3) is electrically connected to the wiring VPO through an opening 425. The other electrode of the photoelectric conversion element 121B(3) is electrically connected to the second electrode of the transistor 122(2) through an opening 178. Note that the transistor 122(2) in FIG. 5 is the same as the transistor 122(2) in FIG. 6.

<Location of Sensor Circuit>

The imaging pixel 110D is electrically connected to the wiring SE, the wiring PR, the wiring TX, the wiring VPR, the wiring WI, and the wiring PO (see FIG. 6).

The imaging pixel 110D includes the transistor 122(1), the transistor 122(2), the transistor 122(3), and the transistor 122(4).

The opening 178 in FIG. 6 is the same as the opening 178 in FIG. 5.

<Cross-sectional Structure of Imaging Pixel>

The cross-sectional structure of the imaging pixel 110D is described with reference to FIG. 7.

The imaging pixel 110D includes, between a substrate 410 and a counter substrate 470, a sensor circuit including the photoelectric conversion element 121B(3) and the transistor 122(2), a display pixel circuit including a transistor 125, and a display pixel including the subpixel 150D(R).

<Substrate>

There is no particular limitation on a substrate that can be used as the substrate 410 as long as it has heat resistance high enough to withstand temperatures in manufacturing steps, has thickness and size that are applicable to manufacturing equipment, and prevents diffusion of an unintentional impurity into a light-emitting element.

A substrate that inhibits diffusion of an unintentional impurity so as to be used as a substrate can be selected depending on a gas-barrier property determined by a light-emitting element used in combination. Specifically, it is possible to use a substrate whose water vapor transmittance is less than or equal to $10^{-5}$ g/m$^2$/day, preferably less than or equal to $10^{-6}$ g/m$^2$/day in the case where an organic EL element is used as the light-emitting element.

Applicable substrate structures are a single-layer structure, a layered structure, and a composite structure including a fibrous or particulate material. For example, a film-like structure with a thickness of greater than or equal to 1 μm and less than 200 μm and a plate-like structure with a thickness of greater than or equal to 0.1 mm can be used.

A substrate whose linear expansion coefficient is decreased so as to be used as the substrate can be selected depending on a difference in linear expansion coefficient with a stacked layer, heat applied in manufacturing steps, and the allowable curl. Specifically, it is possible to use a substrate whose linear expansion coefficient is lower than or equal to $1 \times 10^{-3}$/K, preferably lower than or equal to $5 \times 10^{-5}$/K, and more preferably lower than or equal to $1 \times 10^{-5}$/K.

Examples of materials that can be used for the substrate include glass, ceramics, metal, an inorganic material, and a resin.

Specifically, non-alkali glass, soda-lime glass, potash glass, crystal glass, or the like can be used as glass.

As metal, SUS, aluminum, or the like can be used. Note that by forming an insulating film over a metal surface, the metal surface can be insulated.

As an inorganic film, for example, a metal oxide film, a metal nitride film, a metal oxynitride film, or the like can be used. Specifically, silicon oxide, silicon nitride, silicon oxynitride, an alumina film, or the like can be used.

As the resin, polyester, polyolefin, polyamide, polyimide, polycarbonate, an acrylic resin, or the like can be used.

The substrate 410 in this embodiment is a stacked body in which a base material 410b and a barrier film 410a for preventing diffusion of an unintentional impurity into a light-emitting element are stacked using an adhesive. Specifically, the base material 410b is an aramid resin film, and the barrier film 410a is a flexible inorganic film containing silicon and nitrogen.

<Counter Substrate>

A substrate applicable to the counter substrate 470 can be similar to the substrate 410 as long as it has a light-transmitting property.

Examples of a structure applicable to a surface of the counter substrate 470 include a micro lens and an uneven structure. These structures can be formed by embossing, vacuum molding, blasting, frosting, or the like. A substrate over which a film or the like having projections and depressions is stacked may be used.

When these structures are provided on a light-emitting element 450 side of the counter substrate 470, light emitted from the light-emitting element 450 can enter the counter substrate 470 at a variety of angles. Alternatively, when these structures are provided on a light extraction side of the counter substrate 470, light emitted from the light-emitting element 450 is emitted to the outside from the counter substrate 470 at a variety of angles. Thus, it is difficult to satisfy a condition that light is fully reflected at an interface repeatedly. Consequently, the efficiency of extracting light emitted from the light-emitting element 450 to the outside can be increased.

<Sensor Circuit and Display Pixel Circuit>

The transistor 122(2) in the sensor circuit includes a gate 161, a gate insulating film 162, a semiconductor layer 163, a first electrode 165a, and a second electrode 165b. Note that a protective layer 167 may cover the transistor 122(2) to inhibit diffusion of an unintentional impurity into the semiconductor layer 163.

The display pixel circuit includes the transistor 125. When the transistor 125 is formed in the same steps as the transistor 122(2), manufacturing steps can be simplified.

A capacitor 126 includes a conductive layer including the gate 161, a conductive layer including the second electrode 165b, and the gate insulating film 162 between these conductive layers.

<Photoelectric Conversion Element>

The photoelectric conversion element 121B(3) includes a p-type amorphous silicon layer, an i-type amorphous silicon layer, and an n-type amorphous silicon layer that are stacked.

The p-type amorphous silicon layer is electrically connected to the second electrode 165b of the transistor 122(2) through the opening 178. The n-type amorphous silicon layer is electrically connected to the wiring VPO through the opening 425.

<Planarization Layer>

A planarization layer 421a and a planarization layer 421b form a flat surface over a structural object such as the transistor 122(2). The wiring VPO and the wiring VPR are provided between the planarization layer 421a and the planarization layer 421b.

<Display Pixel>

The display pixel includes the subpixel 150D(R). The subpixel 150D(R) includes a light-emitting module 480 and the display pixel circuit including the transistor 125.

The light-emitting module 480 includes the light-emitting element 450 and a coloring layer 467CF.

The light-emitting element 450 includes a lower electrode 451, an upper electrode 452, and a layer 453 containing a light-emitting organic compound between the lower electrode 451 and the upper electrode 452. Note that by selecting and using the light-emitting organic compound, the layer 453 containing a light-emitting organic compound can emit white light. For example, a plurality of light-emitting organic compounds that emit lights of complementary colors or light-emitting organic compounds that emit lights of red, green, and blue can be used. Furthermore, a light-transmitting conductive film stacked over a reflective conductive film can be used as the lower electrode 451, and a transflective semi-reflective conductive film can be used as the upper electrode 452. With such a structure, a micro resonator can be formed and light with a predetermined wavelength (indicated by an upward arrow in FIG. 7) can be extracted from the light-emitting element 450 efficiently.

A partition 428 is provided over the planarization layer 421b and includes an opening that overlaps the lower electrode 451. The partition 428 further includes an opening 428h that overlaps the photoelectric conversion element 121B(3). The opening 428h takes light entering the imaging pixel 110D from the outside (indicated by a downward arrow in FIG. 7) in the photoelectric conversion element 121B(3) efficiently.

A spacer 429 is provided over the partition 428.

Note that in the case where the upper electrode 452 of the light-emitting element 450 overlaps the photoelectric conversion element 121B(3), a light-transmitting conductive film (e.g., a transflective semi-reflective conductive film) is used as the upper electrode 452. Thus, light entering the imaging pixel 110D from the outside reaches the photoelectric conversion element 121B(3).

<Other Structures>

The imaging pixel 110D includes a light-blocking layer 467BM. The light-blocking layer 467BM includes openings that overlap the light-emitting element 450 and the photoelectric conversion element 121B(3). Note that the light-blocking layer 467BM and the coloring layer 467CF can be provided on the counter substrate 470 side.

A filler 426 is provided between the light-emitting element 450 and the counter substrate 470. As the filler 426, for example, a light-transmitting resin whose refractive index is higher than that of air or an inert gas in which the quantity of unintentional impurities is reduced can be used.

The substrate 410 can be attached to the counter substrate 470 with a sealing agent surrounding a region in which the imaging pixel is provided. Alternatively, the substrate 410 can be attached to the counter substrate 470 with the filler 426.

Note that this embodiment can be combined with any of the other embodiments in this specification as appropriate.

(Embodiment 4)

In this embodiment, the structure of an imaging device with a display function according to one embodiment of the present invention is described with reference to FIGS. 8A and 8B and FIG. 9.

Figure 8A:
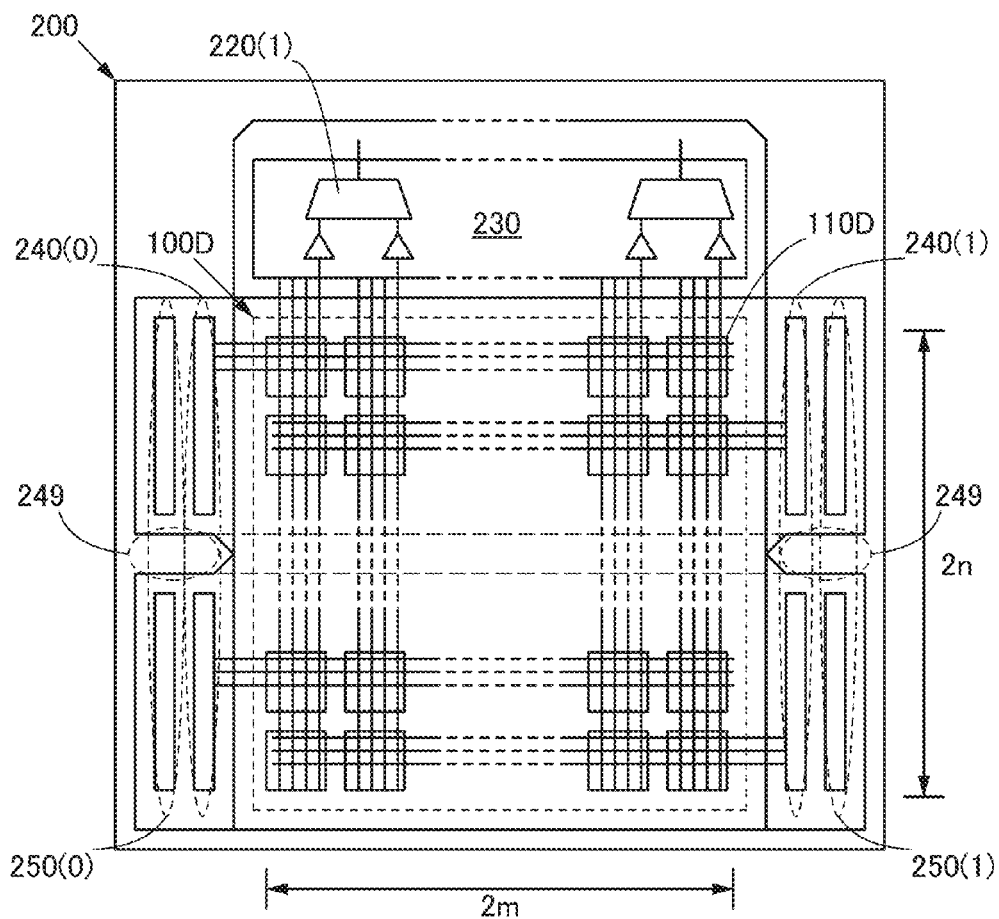
FIGS. 8A and 8B illustrate an imaging device structure according to an embodiment.

FIG. 8A is a block diagram illustrating the structure of an imaging device 200 with a display function according to one embodiment of the present invention. FIG. 8B is a block diagram illustrating a read circuit 230 included in the imaging device 200 in FIG. 8A.

Figure 9:
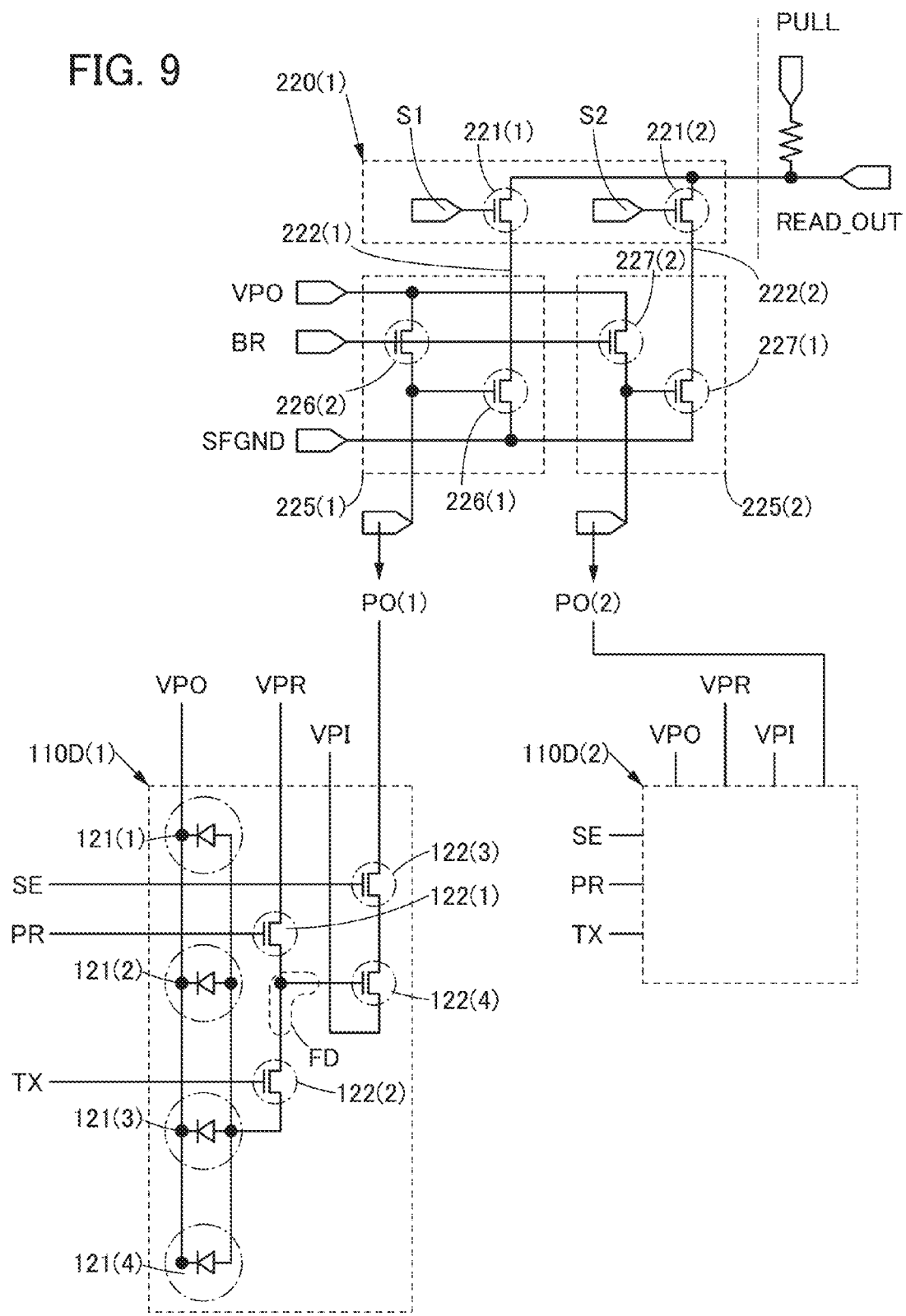
FIG. 9 is a circuit diagram illustrating a read circuit that can be used in an imaging device according to an embodiment.

FIG. 9 is a circuit diagram of a read circuit and a sensor circuit of an imaging pixel that can be used in the imaging device 200.

Figure 8B:
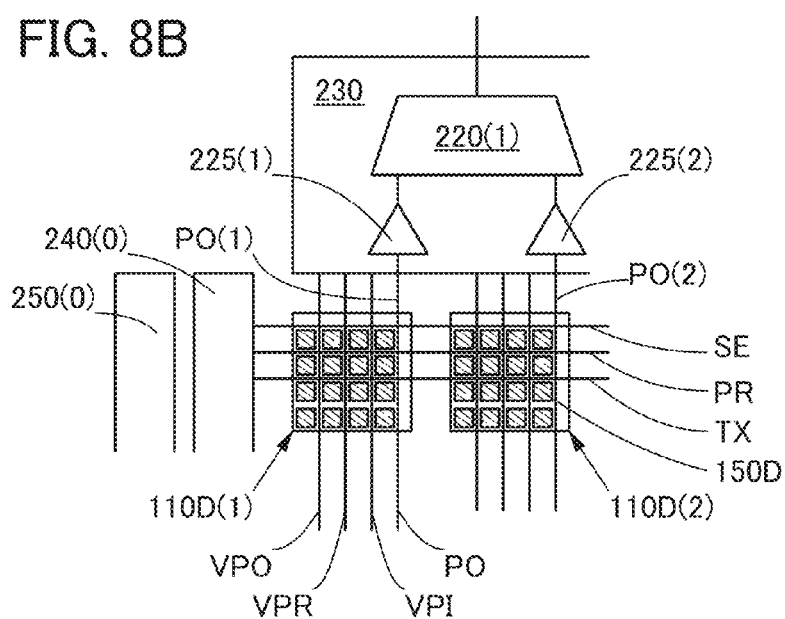

The imaging device 200 in this embodiment has a display function. Furthermore, the imaging device 200 includes an imaging panel that includes a first imaging pixel 110D(1) including a sensor circuit capable of supplying a first imaging signal and a second imaging pixel 110D(2) including a sensor circuit capable of supplying a second imaging signal;

and the read circuit 230 supplied with the first imaging signal and the second imaging signal (see FIGS. 8A and 8B).

The read circuit 230 includes a first amplifier 225(1) capable of amplifying the first imaging signal to a first amplified signal and supplying the first amplified signal, a second amplifier 225(2) capable of amplifying the second imaging signal to a second amplified signal and supplying the second amplified signal, and a selection circuit 220(1) selecting and supplying one of the first amplified signal and the second amplified signal.

Thus, the selection circuit 220(1) can select an imaging pixel for reading a signal from a number of imaging pixels provided in a wide area of the imaging panel 100D. In other words, for example, the half of a plurality of imaging signals supplied from a plurality of imaging pixels provided in a wide area can be read while the imaging signals are thinned out. Furthermore, a signal amplified by the amplifier can be supplied to the selection circuit 220(1). As a result, it is possible to provide a novel imaging device that can perform high-speed signal processing, has high noise resistance, or hardly malfunctions.

Note that the imaging panel 100D includes the plurality of imaging pixels 110D arranged in 2n rows 2m columns (n and m are each an integer of 1 or more) (see FIG. 8A).

A set of the wiring PR, the wiring TX, and the wiring SE is provided in each row of the imaging pixels, and the set of the wiring PR, the wiring TX, and the wiring SE is connected to the imaging pixels in the corresponding row (see FIG. 8B).

A set of the wiring VPO, the wiring VPR, the wiring PO, and the wiring WI is provided in each column of the imaging pixels, and the set of the wiring VPO, the wiring VPR, the wiring PO, and the wiring WI is electrically connected to the imaging pixels in the corresponding column. Note that a wiring PO(1) is electrically connected to an imaging pixel 100D(1), and a wiring PO(2) is electrically connected to an imaging pixel 100D(2).

The imaging device 200 further includes a driver circuit 240(0) and a driver circuit 240(1) (see FIG. 8A).

The imaging panel 100D with a display function includes 16 (4×4) display pixels 150D in one imaging pixel 110D (see FIGS. 8A and 8B). Furthermore, the imaging panel 100D includes 4×2n unillustrated scan lines extending in the row direction and 4×2m unillustrated image signal lines extending in the column direction.

The 4×2m display pixels in the row direction are electrically connected to one scan line, and the 4×2n display pixels in the column direction are connected to one image signal line to form a matrix.

The imaging device 200 includes a scan line driver circuit 250(0) and a scan line driver circuit 250(1) (see FIG. 8A). The scan line driver circuits can supply selection signals to the scan lines.

An unillustrated signal line driver circuit can supply image signals to the image signal lines.

An image signal is written to the display pixel 150D supplied with a selection signal, and then the display pixel 150D can display an image based on the written image signal.

The selection signal and the image signal are supplied through a wiring that is different from a wiring for supplying a signal to the imaging pixel. Thus, the display pixel can be driven independently of the imaging pixel operation.

Components included in the imaging device 200 that can be used in an imaging panel according to one embodiment of the present invention are described below.
<Driver Circuit>

The driver circuit 240(0) can supply signals to the wiring PR, the wiring TX, and the wiring SE in an odd-numbered row, and the wiring PR, the wiring TX, and the wiring SE in the odd-numbered row can supply signals to the imaging pixels 110D in the odd-numbered row (see FIG. 8A).

The driver circuit 240(1) can supply signals to the wiring PR, the wiring TX, and the wiring SE in an even-numbered row, and the wiring PR, the wiring TX, and the wiring SE in the even-numbered row can supply signals to the imaging pixels 110D in the even-numbered row.

By using the driver circuit 240(0) and the driver circuit 240(1) that operate independently of each other, an image shot using the driver circuit 240(0) and an image shot using the driver circuit 240(1) can be calculated.

For example, by calculating a difference between two images of different illumination conditions, the position of a shot object can be identified. Alternatively, by calculating the sum of two images of the same illumination condition, a signal can be increased.

Note that regions 249 with no circuit are provided to divide each of the driver circuit 240(0) and the driver circuit 240(1) into two regions. When each of the driver circuit 240(0) and the driver circuit 240(1) is divided and provided over a flexible substrate, it is possible to provide an imaging panel that can be bent in the regions 249. By providing circuits in portions excluding portions to be bent, concentration of stress caused by bending operation on the circuits can be prevented.

Each of the driver circuit 240(0) and the driver circuit 240(1) supplies signals to n sets of the wiring SE, the wiring PR, and the wiring TX. The driver circuit can be formed using a known sequential circuit as long as it can sequentially supply signals to the imaging pixels in the n rows. For example, the driver circuit can be formed using a shift register.
<Read Circuit>

Structure examples of a selection circuit and an amplifier that can be used in the read circuit 230 are described with reference to FIG. 9.

FIG. 9 is a circuit diagram illustrating the read circuit 230. Specifically, FIG. 9 includes circuit diagrams of the selection circuit 220(1), the first amplifier 225(1), and the second amplifier 225(2). FIG. 9 also illustrates circuit diagrams of the sensor circuits included in the first imaging pixel 110D (1) and the second imaging pixel 110D(2) from which current can be read using the selection circuit 220(1).

The selection circuit 220(1) includes a transistor 221(1) and a transistor 221(2). A gate of the transistor 221(1) is electrically connected to a terminal 51 supplied with a first selection signal. A first electrode of the transistor 221(1) is electrically connected to a read terminal READ_OUT. A second electrode of the transistor 221(1) is electrically connected to a wiring 222(1). A gate of the transistor 221(2) is electrically connected to a terminal S2 supplied with a second selection signal. A first electrode of the transistor 221(2) is electrically connected to the read terminal READ_OUT. A second electrode of the transistor 221(2) is electrically connected to a wiring 222(2).

The first amplifier 225(1) includes a transistor 226(1) and a transistor 226(2). A gate of the transistor 226(1) is electrically connected to the wiring PO(1). A first electrode of the transistor 226(1) is electrically connected to the wiring 222(1). A second electrode of the transistor 226(1) is electrically connected to a wiring SFGND. A gate of the transistor 226(2) is electrically connected to a wiring BR. A first electrode of the transistor 226(2) is electrically connected to the wiring VPO. A second electrode of the transistor 226(2) is electrically connected to the wiring PO(1).

The second amplifier 225(2) includes a transistor 227(1) and a transistor 227(2). A gate of the transistor 227(1) is electrically connected to the wiring PO(2). A first electrode of the transistor 227(1) is electrically connected to the wiring 222(2). A second electrode of the transistor 227(1) is electrically connected to the wiring SFGND. A gate of the transistor 227(2) is electrically connected to the wiring BR. A first electrode of the transistor 227(2) is electrically connected to the wiring VPO. A second electrode of the transistor 227(2) is electrically connected to the wiring PO(2).

Note that the wiring PO(1) is electrically connected to the first imaging pixel 110D(1), and the wiring PO(2) is electrically connected to the second imaging pixel 110D(2). A terminal PULL is electrically connected to the terminal READ_OUT through a load.

<Method for Driving Read Circuit>

The read circuit can be driven by the following steps.

Although an example of a method for driving a read circuit including n-channel transistors is described here, this embodiment is not limited thereto.

A sufficiently high power supply potential is supplied to the wiring VPO, and a sufficiently low power supply potential is supplied to the wiring SFGND.

In a first step of the method for driving a read circuit, light has already been delivered to the first imaging pixel 110D(1) and the second imaging pixel 110D(2) and low-level signals are supplied to the wiring SE, the wiring PR, and the wiring TX. Thus, for example, the transistor 122(3), the transistor 122(2), and the transistor 122(1) in the first imaging pixel 110D(1) are off. Consequently, the potential of each node FD is based on the amount of delivered light.

In the first step, a high-level signal is supplied to the wiring BR to turn on the transistor 226(2) and the transistor 227(2). Thus, the potentials of the wiring PO(1) and the wiring PO(2) are based on the potential of the wiring VPO. In addition, the transistor 226(1) is turned on, so that the potentials of the wiring 222(1) and the wiring 222(2) are based on the potential of the wiring SFGND.

In a second step, a low-level signal is supplied to the wiring BR to turn off the transistor 226(2) and the transistor 227(2). In addition, a high-level signal is supplied to the wiring SE to turn on the transistor 122(3) in the first imaging pixel 110D(1). Thus, the potential of the wiring PO(1) is based on current flowing through the transistor 122(4) in the first imaging pixel 110D(1). Note that the current flowing through the transistor 122(4) is based on the potential of the node FD. Consequently, the potential of the wiring PO(1) is based on the amount of light delivered to the first imaging pixel 110D(1). Furthermore, since the second imaging pixel 110D(2) operates similarly, the potential of the wiring PO(2) is based on the amount of light delivered to the second imaging pixel 110D(2).

In a third step, a high-level signal is supplied to the terminal 51 to turn on the transistor 221(1), and a low-level signal is supplied to the terminal S2 to turn off the transistor 221(2).

The potential based on the amount of light delivered to the first imaging pixel 110D(1) is supplied to the gate of the transistor 226(1) from the wiring PO(1). Thus, current flowing through the transistor 226(1) from the read terminal READ_OUT to the wiring SFGND is based on the amount of light delivered to the first imaging pixel 110D(1).

In a fourth step, a low-level signal is supplied to the terminal 51 to turn off the transistor 221(1), and a high-level signal is supplied to the terminal S2 to turn on the transistor 221(2).

The potential based on the amount of light delivered to the second imaging pixel 110D(2) is supplied to the gate of the transistor 227(1) from the wiring PO(2). Thus, current flowing through the transistor 227(1) from the read terminal READ_OUT to the wiring SFGND is based on the amount of light delivered to the second imaging pixel 110D(2).

Through the above steps, the amount of light delivered to the first imaging pixel 110D(1) and the amount of light delivered to the second imaging pixel 110D(2) can be read sequentially.

<Display Pixel>

The display pixel 150D includes a display element and a pixel circuit for driving the display element. As the display element, a liquid crystal element, an organic electroluminescent element, or the like can be used.

<Scan Line Driver Circuit>

Each of the scan line driver circuit 250(0) and the scan line driver circuit 250(1) supplies selection signals to 2n scan lines. For example, the scan line driver circuit can be formed using a known sequential circuit and can supply signals to the display pixels in 2n rows sequentially. For example, a shift register can be used as the scan line driver circuit.

This embodiment can be combined with any of the other embodiments in this specification as appropriate.

(Embodiment 5)

In this embodiment, a method for driving the display pixel 150D that can be used in the imaging panel 100D with a display function according to one embodiment of the present invention is described with reference to FIGS. 11A and 11B and FIGS. 12A and 12B.

Figure 11A:
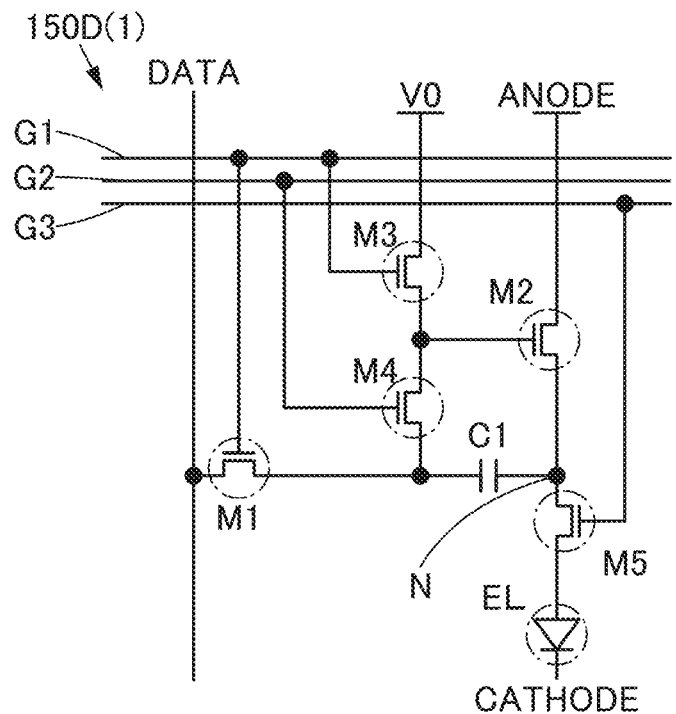
FIG. 11A is a circuit diagram of a display pixel circuit according to an embodiment.
Figure 11B:
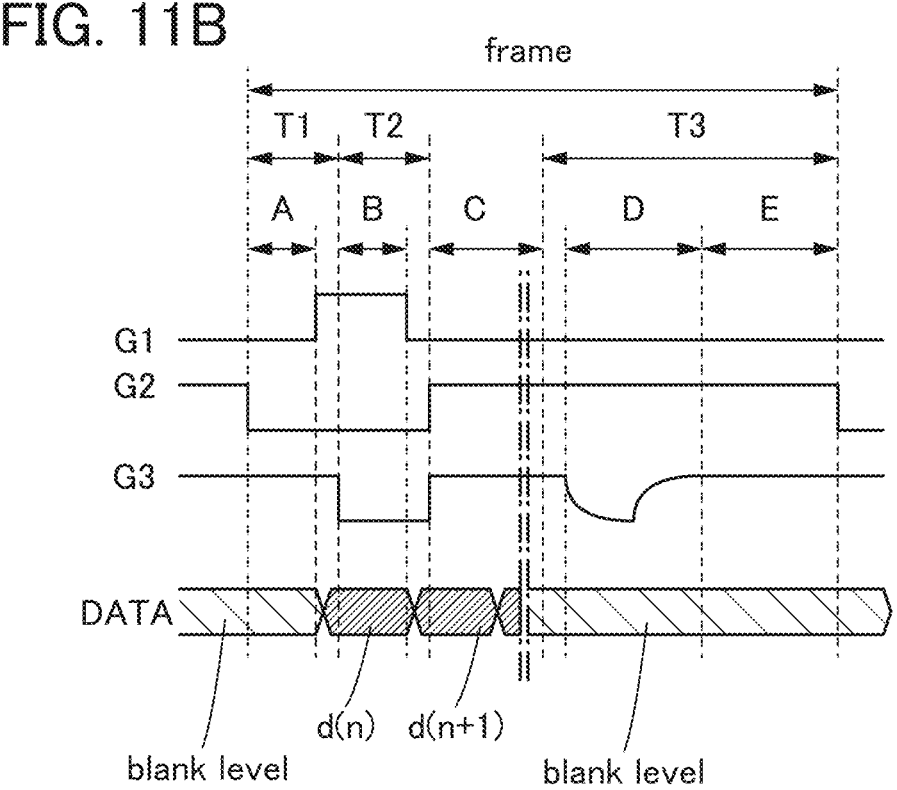
FIG. 11B is a timing chart showing a method for driving the display pixel circuit.

FIG. 11A is a circuit diagram of a display pixel circuit that can be used for a subpixel 150D(1) of the display pixel 150D. FIG. 11B is a timing chart showing a method for driving the display pixel circuit in FIG. 11A.

Figure 12A:
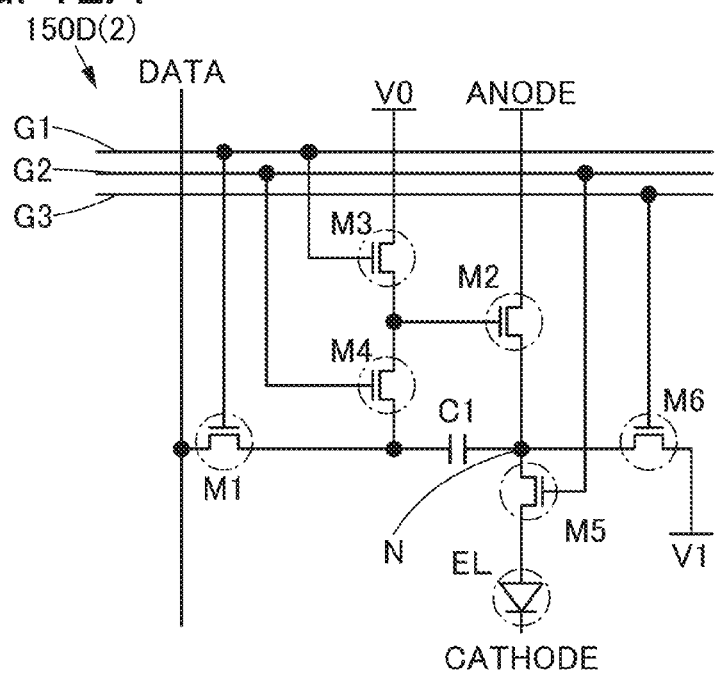
FIG. 12A is a circuit diagram of a display pixel circuit according to an embodiment.
Figure 12B:
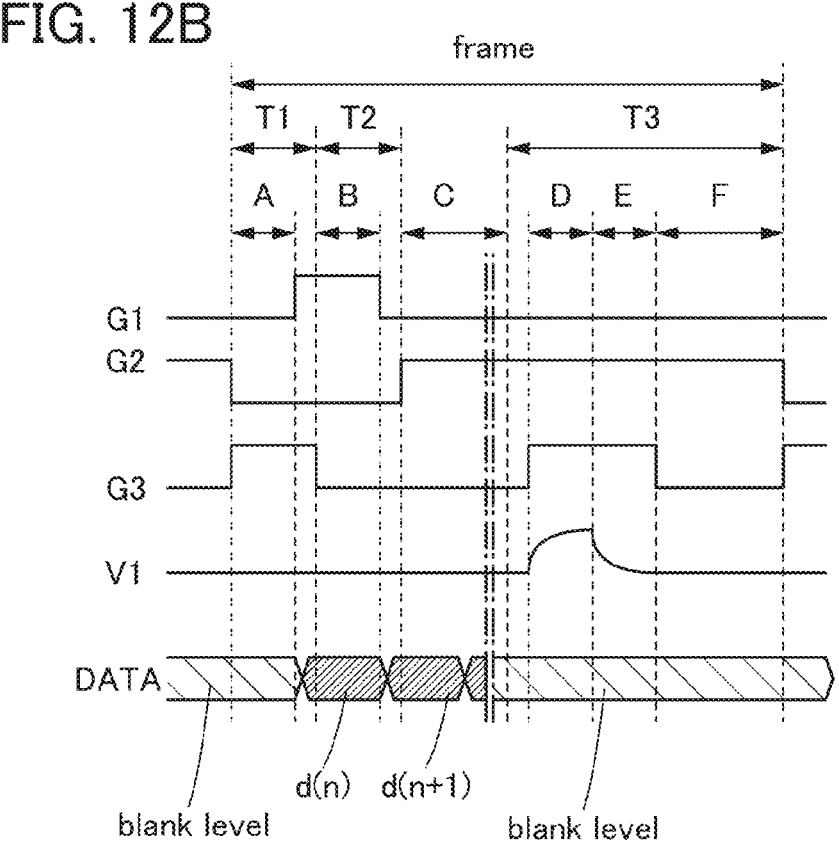
FIG. 12B is a timing chart showing a method for driving the display pixel circuit.

FIG. 12A is a circuit diagram of a display pixel circuit that can be used for a subpixel 150D(2) that has a structure different from that of FIGS. 11A and 11B. FIG. 12B is a timing chart showing a method for driving the pixel circuit in FIG. 12A.

<Method for Calculating Distance from Imaging Panel to Object>

The imaging panel 100D with a display function includes display pixels and imaging pixels. Thus, the imaging pixel 110D can shoot an object while the display pixel 150D emits light. In addition, the imaging pixel 110D can shoot an object while the display pixel 150D does not emit light. Note that in this specification, the former image is referred to as a bright image and the latter image is referred to as a dark image.

In the case where the imaging panel 100D with a display function is used as a touch panel, whether an object is in contact with the imaging panel 100D can be determined by a difference between a bright image and a dark image. Specifically, a portion of the object that is in contact with the imaging panel 100D can be determined by a bright portion obtained by subtraction of a dark image including a background image from a bright image.

<Driving Method 1 for Display Element>

A driving method of the subpixel 150D(1) for shooting a bright image and a dark image is described with reference to FIGS. 11A and 11B.

The subpixel 150D(1) in FIG. 11A includes five n-channel transistors M1 to M5, a capacitor C1, and a display element EL formed using an organic electroluminescent element.

Note that by the method for driving the display pixel circuit, a bright image and a dark image can be shoot, and a fluctuation of the threshold voltage of the transistor M2 that supplies current to the display element EL can be compensated.

The subpixel 150D(1) is electrically connected to wirings G1 to G3. In addition, the subpixel 150D(1) is electrically connected to a wiring DATA, a wiring V0, a wiring ANODE, and a wiring CATHODE.

Note that the wiring DATA is a wiring through which an image signal can be supplied. A signal d(n) in FIG. 11B is an image signal supplied to display pixels in the n-th row. A signal d(n+1) is an image signal supplied to display pixels in the (n+1)th row. The wiring V0 and the wiring CATHODE are wirings through which potentials low enough to operate the subpixel 150D(1) correctly can be supplied. Similarly, the wiring ANODE is a wiring through which a sufficiently high potential can be supplied.

A frame in FIG. 11B corresponds to one frame period of an image. A period T1 and a period T2 each correspond to one horizontal period, and a period T3 corresponds to a vertical retrace period.

In a first step (corresponding to a period A in FIG. 11B), low-level signals are supplied to the wiring G1 and the wiring G2, and a high-level signal is supplied to the wiring G3. Thus, the transistor M1, the transistor M3, and the transistor M4 are turned off, and the transistor M5 is turned on. Consequently, the potential of a node N is initialized.

In a second step (corresponding to a period B in FIG. 11B), a high-level signal is supplied to the wiring G1, and low-level signals are supplied to the wiring G2 and the wiring G3. Thus, the transistor M1 and the transistor M3 are turned on, and the transistor M4 and the transistor M5 are turned off. Consequently, an image signal supplied through the wiring DATA is written to the capacitor C1, and a potential based on the threshold voltage of the transistor M2 is written to the node N.

In a third step (corresponding to a period C in FIG. 11B), a low-level signal is supplied to the wiring G1, and high-level signals are supplied to the wiring G2 and the wiring G3. Thus, the transistor M1 and the transistor M3 are turned off, and the transistor M4 and the transistor M5 are turned on. The capacitor C1 applies voltage based on an image signal and the threshold voltage of the transistor M2 between a gate and a source of the transistor M2. Consequently, current flows from the wiring ANODE to the wiring CATHODE through the transistor M2 and the display element EL that are connected to each other in series. Note that the display element EL emits light roughly in proportion to the amount of current.

In a fourth step (corresponding to a period D in FIG. 11B), a low-level potential is supplied to the wiring G3. Thus, the transistor M5 is turned off, which makes the display element EL not to emit light regardless of the image signal that has been written. Consequently, a dark image can be obtained by using the imaging panel 100D.

In a fifth step (corresponding to a period E in FIG. 11B), a high-level potential is supplied to the wiring G3. Thus, the transistor M5 is turned on, which makes the display element EL emit light in accordance with the image signal that has been written. Consequently, a bright image can be obtained by using the imaging panel 100D.

By repeating the first to fifth steps, the imaging panel 100D can shoot a set of a bright image and a dark image in each frame.

Note that by altering the sequence of the fourth step and the fifth step, it is possible to shoot a bright image and then shoot a dark image.

<Driving Method 2 for Display Element>

A driving method of the subpixel 150D(2) for shooting a bright image and a dark image is described with reference to FIGS. 12A and 12B.

The subpixel 150D(2) in FIG. 12A includes six n-channel transistors M1 to M6, the capacitor C1, and the display element EL formed using an organic electroluminescent element.

Note that by the method for driving the display pixel circuit, a bright image and a dark image can be shoot, and a fluctuation of the threshold voltage of the transistor M2 that supplies current to the display element EL can be compensated.

The subpixel 150D(2) is electrically connected to the wirings G1 to G3. In addition, the subpixel 150D(2) is electrically connected to the wiring DATA, the wiring V0, a wiring V1, the wiring ANODE, and the wiring CATHODE.

Note that the wiring DATA is a wiring through which an image signal can be supplied. The signal d(n) in FIG. 12B is an image signal supplied to display pixels in the n-th row. The signal d(n+1) is an image signal supplied to display pixels in the (n+1)th row. The wiring V0 and the wiring CATHODE are wirings through which potentials low enough to operate the subpixel 150D(2) correctly can be supplied. Similarly, the wiring ANODE is a wiring through which a sufficiently high potential can be supplied.

A frame in FIG. 12B corresponds to one frame period of an image. The period T1 and the period T2 each correspond to one horizontal period, and the period T3 corresponds to a vertical retrace period.

In a first step (corresponding to a period A in FIG. 12B), low-level signals are supplied to the wiring G1 and the wiring G2, a high-level signal is supplied to the wiring G3, and a low-level potential is supplied to the wiring V1. Thus, the transistor M1, the transistor M3, the transistor M4, and the transistor M5 are turned off, and the transistor M6 is turned on. Consequently, the potential of the node N is initialized to a low-level potential supplied through the wiring V1.

In a second step (corresponding to a period B in FIG. 12B), a high-level signal is supplied to the wiring G1, low-level signals are supplied to the wiring G2 and the wiring G3, and a low-level potential is supplied to the wiring V1. Thus, the transistor M1 and the transistor M3 are turned on, and the transistor M4 and the transistor M6 are turned off. Consequently, an image signal supplied through the wiring DATA is written to the capacitor C1, and a potential based on the threshold voltage of the transistor M2 is written to the node N.

In a third step (corresponding to a period C in FIG. 12B), low-level signals are supplied to the wiring G1 and the wiring G3, a high-level signal is supplied to the wiring G2, and a low-level potential is supplied to the wiring V1. Thus, the transistor M1, the transistor M3, and the transistor M6 are turned off, and the transistor M4 and the transistor M5 are turned on. The capacitor C1 applies voltage based on an image signal and the threshold voltage of the transistor M2 between the gate and the source of the transistor M2. Consequently, current flows from the wiring ANODE to the wiring CATHODE through the transistor M2 and the display element EL that are connected to each other in series. Note that the display element EL emits light roughly in proportion to the amount of current.

In a fourth step (corresponding to a period D in FIG. 12B), a high-level signal is supplied to the wiring G3, and a high-level potential is supplied to the wiring V1. Thus, the transistor M6 is turned on, which makes the display element EL emit light regardless of the image signal that has been written. Consequently, a bright image can be obtained by using the imaging panel 100D.

In a fifth step (corresponding to a period E in FIG. 12B), a high-level signal is supplied to the wiring G3, and a low-level potential is supplied to the wiring V1. Thus, the transistor M6 is turned on, which makes the display element EL not to emit light regardless of the image signal that has been written. Consequently, a dark image can be obtained by using the imaging panel 100D.

In a sixth step (corresponding to a period F in FIG. 12B), a low-level potential is supplied to the wiring G3. Thus, the transistor M6 is turned off, which makes the display element EL emit light in accordance with the image signal that has been written.

By repeating the first to sixth steps, the imaging panel 100D can shoot a set of a bright image and a dark image in each frame.

Note that by altering the sequence of the fourth step and the fifth step, it is possible to shoot a bright image and then shoot a dark image.

Note that this embodiment can be combined with any of the other embodiments in this specification as appropriate.
(Embodiment 6)

In this embodiment, an oxide semiconductor film that can be used for a transistor of an imaging panel according to one embodiment of the present invention is described.

A highly-purified oxide semiconductor (purified oxide semiconductor) obtained by reduction of impurities such as moisture or hydrogen that serve as electron donors (donors) and reduction of oxygen vacancies is an intrinsic (i-type) semiconductor or a substantially intrinsic semiconductor. Thus, a transistor including a channel formation region in a highly-purified oxide semiconductor film has extremely low off-state current and high reliability.

Specifically, various experiments can prove low off-state current of a transistor including a channel formation region in a highly-purified oxide semiconductor film.

For example, even when an element has a channel width of $1 \times 10^6$ μm and a channel length of 10 μm, off-state current can be lower than or equal to the measurement limit of a semiconductor parameter analyzer, i.e., lower than or equal to $1 \times 10^{-13}$ A, at a voltage (drain voltage) between a source electrode and a drain electrode of 1 to 10 V. In that case, it can be seen that off-state current standardized on the channel width of the transistor is lower than or equal to 100 zA/μm. In addition, a capacitor and a transistor were connected to each other and off-state current was measured using a circuit in which electric charge flowing to or from the capacitor is controlled by the transistor. In the measurement, a highly-purified oxide semiconductor film was used in the channel formation region of the transistor, and the off-state current of the transistor was measured from a change in the amount of electric charge of the capacitor per unit hour. As a result, it can be seen that, in the case where the voltage between the source electrode and the drain electrode of the transistor is 3 V, a lower off-state current of several tens of yoctoamperes per micrometer is obtained. Accordingly, the transistor including the highly-purified oxide semiconductor film in the channel formation region has much lower off-state current than a crystalline silicon transistor.

Note that unless otherwise specified, in this specification, off-state current of an n-channel transistor is current that flows between a source and a drain when the potential of the drain is higher than that of the source or that of a gate while the potential of the gate is 0 V or lower in the case of the potential of the source used as a reference. Alternatively, in this specification, off-state current of a p-channel transistor is current that flows between a source and a drain when the potential of the drain is lower than that of the source or that of a gate while the potential of the gate is 0 V or higher in the case of the potential of the source used as a reference.

An oxide semiconductor used for the transistor preferably contains at least indium (In) or zinc (Zn). As a stabilizer for reducing variations in electrical characteristics of a transistor including the oxide semiconductor, the oxide semiconductor preferably contains gallium (Ga) in addition to In and Zn. Tin (Sn) is preferably contained as a stabilizer. Hafnium (Hf) is preferably contained as a stabilizer. Aluminum (Al) is preferably contained as a stabilizer. Zirconium (Zr) is preferably contained as a stabilizer.

Among the oxide semiconductors, unlike silicon carbide, gallium nitride, or gallium oxide, an In—Ga—Zn-based oxide, an In—Sn—Zn-based oxide, or the like has an advantage of high mass productivity because a transistor with favorable electrical characteristics can be formed by sputtering or a wet process. Furthermore, unlike silicon carbide, gallium nitride, or gallium oxide, with the use of the In—Ga—Zn-based oxide, a transistor with favorable electrical characteristics can be formed over a glass substrate. Furthermore, a larger substrate can be used.

As another stabilizer, one or more kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

For example, indium oxide, gallium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide can be used as an oxide semiconductor.

Note that, for example, an In—Ga—Zn-based oxide means an oxide containing In, Ga, and Zn, and there is no limitation on the ratio of In, Ga, and Zn. In addition, the In—Ga—Zn-based oxide may contain a metal element other than In, Ga, and Zn. The In—Ga—Zn-based oxide has sufficiently high resistance when no electric field is applied thereto, so that off-state current can be sufficiently reduced. Furthermore, the In—Ga—Zn-based oxide has high mobility.

For example, an In—Ga—Zn-based oxide with an atomic ratio of In:Ga:Zn=1:1:1 (=1/3:1/3:1/3) or In:Ga:Zn=2:2:1 (=2/5:2/5:1/5), or an oxide whose composition is in the neighborhood of the above composition can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or an oxide whose composition is in the neighborhood of the above composition is preferably used.

For example, with an In—Sn—Zn-based oxide, high mobility can be comparatively easily obtained. However, even with an In—Ga—Zn-based oxide, mobility can be increased by lowering defect density in a bulk.

An oxide semiconductor film may be in a non-single-crystal state, for example. The non-single-crystal state is, for example, structured by at least one of c-axis aligned crystal (CAAC), polycrystal, and microcrystal. The density of defect states of microcrystal is higher than that of CAAC. Note that an oxide semiconductor including CAAC is referred to as a c-axis aligned crystalline oxide semiconductor (CAAC-OS).

For example, the oxide semiconductor film may include a CAAC-OS. In the CAAC-OS, for example, c-axes are aligned, and a-axes and/or b-axes are not macroscopically aligned.

For example, the oxide semiconductor film may include microcrystal. Note that an oxide semiconductor including microcrystal is referred to as a microcrystalline oxide semiconductor. A microcrystalline oxide semiconductor film, for example, includes an oxide semiconductor including a microcrystal of greater than or equal to 1 nm and less than 10 nm.

Note that an oxide semiconductor film may be a mixed film including a CAAC-OS and a microcrystalline oxide semiconductor. The mixed film, for example, includes a region of a microcrystalline oxide semiconductor and a region of a CAAC-OS. Furthermore, the mixed film may have a layered structure including a region of a microcrystalline oxide semiconductor and a region of a CAAC-OS, for example.

Note that the oxide semiconductor film may be in a single-crystal state, for example.

The oxide semiconductor film preferably includes a plurality of crystal parts. In each of the crystal parts, a c-axis is preferably aligned in a direction parallel to a normal vector of a surface where the oxide semiconductor film is formed or a normal vector of a surface of the oxide semiconductor film. Note that among crystal parts, the directions of the a-axis and the b-axis of one crystal part may be different from those of another crystal part. An example of such an oxide semiconductor film is a CAAC-OS film.

In most cases, a crystal part in the CAAC-OS film fits into a cube whose one side is less than 100 nm. In an image obtained with a transmission electron microscope (TEM), a boundary between crystal parts in the CAAC-OS film are not clearly detected. Furthermore, with the TEM, a grain boundary in the CAAC-OS film is not clear. Thus, in the CAAC-OS film, a reduction in electron mobility, due to the grain boundary, is inhibited.

In each of the crystal parts included in the CAAC-OS film, for example, a c-axis is aligned in a direction parallel to a normal vector of a surface where the CAAC-OS film is formed or a normal vector of a surface of the CAAC-OS film. Furthermore, in each of the crystal parts, metal atoms are arranged in a triangular or hexagonal configuration when seen from the direction perpendicular to the a-b plane, and metal atoms are arranged in a layered manner or metal atoms and oxygen atoms are arranged in a layered manner when seen from the direction perpendicular to the c-axis. Note that among crystal parts, the directions of the a-axis and the b-axis of one crystal part may be different from those of another crystal part. In this specification, the term "perpendicular" includes a range from 80 to 100°, preferably from 85 to 95°. In addition, the term "parallel" includes a range from −10 to 10°, preferably from −5 to 5°.

In the CAAC-OS film, distribution of crystal parts is not necessarily uniform. For example, in the formation process of the CAAC-OS film, in the case where crystal growth occurs from a surface side of the oxide semiconductor film, the proportion of crystal parts in the vicinity of the surface of the oxide semiconductor film is higher than that in the vicinity of the surface where the oxide semiconductor film is formed in some cases. Furthermore, when an impurity is added to the CAAC-OS film, the crystallinity of the crystal part in a region to which the impurity is added is lowered in some cases.

Since the c-axes of the crystal parts included in the CAAC-OS film are aligned in the direction parallel to a normal vector of a surface where the CAAC-OS film is formed or a normal vector of a surface of the CAAC-OS film, the directions of the c-axes might be different from each other depending on the shape of the CAAC-OS film (the cross-sectional shape of the surface where the CAAC-OS film is formed or the cross-sectional shape of the surface of the CAAC-OS film). Note that the c-axes of the crystal parts are aligned in the direction parallel to a normal vector of the surface where the CAAC-OS film is formed or a normal vector of the surface of the CAAC-OS film. The crystal part is formed by deposition or by crystallization treatment such as heat treatment after deposition.

In a transistor including the CAAC-OS film, changes in electrical characteristics of the transistor due to irradiation with visible light or ultraviolet light are small. Thus, the transistor has high reliability.

For example, a CAAC-OS film is deposited by sputtering with a polycrystalline metal oxide target. When ions collide with the target, a crystal region included in the target might be separated from the target along the a-b plane, and a sputtered particle having a plane parallel to the a-b plane (flat-plate-like or pellet-like sputtered particle) might be separated from the target. In that case, the flat-plate-like or pellet-like sputtered particle reaches a substrate while maintaining its crystal state, so that the CAAC-OS film can be deposited.

For the deposition of the CAAC-OS film, the following conditions are preferably employed.

By reducing the amount of impurities entering the CAAC-OS film during the deposition, the crystal state can be prevented from being broken by the impurities. For example, the concentration of impurities (e.g., hydrogen, water, carbon dioxide, or nitrogen) which exist in a treatment chamber may be reduced. Furthermore, the concentration of impurities in a deposition gas may be reduced. Specifically, a deposition gas whose dew point is −80° C. or lower, preferably −100° C. or lower is used.

By increasing the substrate heating temperature during the deposition, migration of a sputtered particle occurs after the sputtered particle reaches the substrate. Specifically, the substrate heating temperature during the deposition is 100 to 740° C., preferably 200 to 500° C. By increasing the substrate heating temperature during the deposition, when the flat-plate-like or pellet-like sputtered particle reaches the substrate, migration occurs on the substrate, so that a flat plane of the sputtered particle is attached to the substrate.

Furthermore, it is preferable to reduce plasma damage during the deposition by increasing the proportion of oxygen in the deposition gas and optimizing power. The proportion of oxygen in the deposition gas is 30 vol % or higher, preferably 100 vol %.

As an example of the target, an In—Ga—Zn-based oxide target is described below.

A polycrystalline In—Ga—Zn-based oxide target is made by mixing $InO_X$ powder, $GaO_Y$ powder, and $ZnO_Z$ powder in a predetermined mole ratio, applying pressure, and performing heat treatment at 1000 to 1500° C. Note that X, Y, and Z are each a given positive number. Here, the predetermined mole ratio of the $InO_X$ powder, the $GaO_Y$ powder, and the $ZnO_Z$ powder is, for example, 2:2:1, 8:4:3, 3:1:1, 1:1:1, 4:2:3, or 3:1:2. The kind of powder and the mole ratio for mixing powder may be changed as appropriate depending on a target to be formed.

Alkali metal is not an element included in an oxide semiconductor and thus is an impurity. Alkaline earth metal is also an impurity in the case where alkaline earth metal is not included in an oxide semiconductor. Alkali metal, in particular, Na becomes $Na^+$ when an insulating film that is in contact with an oxide semiconductor film is an oxide and Na diffuses into the insulating film. In addition, in the oxide semiconductor film, Na cuts or enters a bond between metal and oxygen that are included in an oxide semiconductor. As a result, for example, degradation in transistor electrical characteristics, such as a normally on state of the transistor due to a shift in the threshold voltage in a negative direction, or a decrease in mobility, occurs. Specifically, the measurement value of a Na concentration by secondary ion mass spectrometry is preferably $5\times10^{16}/cm^3$ or less, more preferably $1\times10^{16}/cm^3$ or less, still more preferably $1\times10^{15}/cm^3$ or less. Similarly, the measurement value of a Li concentration is preferably $5\times10^{15}/cm^3$ or less, more preferably $1\times10^{15}/cm^3$ or less. Similarly, the measurement value of a K concentration is preferably $5\times10^{15}/cm^3$ or less, more preferably $1\times10^{15}/cm^3$ or less.

In the case where a metal oxide containing indium is used, silicon or carbon having higher bond energy with oxygen than indium might cut the bond between indium and oxygen, so that an oxygen vacancy is formed. Accordingly, when silicon or carbon is contained in the oxide semiconductor film, the transistor electrical characteristics are likely to be degraded as in the case of alkali metal or alkaline earth metal. Thus, the concentration of silicon and carbon in the oxide semiconductor film is preferably low. Specifically, the measurement value of a C concentration or the measurement value of a Si concentration by secondary ion mass spectrometry is preferably $1\times10^{18}/cm^3$ or less. In that case, the degradation in transistor electrical characteristics can be prevented, so that the reliability of the semiconductor device can be increased.

Metal in the source electrode and the drain electrode extracts oxygen from the oxide semiconductor film depending on a conductive material used for the source electrode and the drain electrode. In that case, a region in the oxide semiconductor film that is in contact with the source electrode and the drain electrode has n-type conductivity due to generation of oxygen vacancies.

Since the region having n-type conductivity functions as a source region or a drain region, contact resistance between the oxide semiconductor film and the source electrode and the drain electrode can be lowered. Thus, by forming the region having n-type conductivity, the mobility and on-state current of the transistor can be increased, so that a switch circuit including the transistor can operate at high speed.

Note that metal in the source electrode and the drain electrode might extract oxygen when the source electrode and the drain electrode are formed by sputtering or the like or might extract oxygen by heat treatment performed after the source electrode and the drain electrode are formed.

Furthermore, the region having n-type conductivity is easily formed by using a conductive material that is easily bonded to oxygen for the source electrode and the drain electrode. The conductive material can be, for example, Al, Cr, Cu, Ta, Ti, Mo, or W.

The oxide semiconductor film is not limited to a single-layer metal oxide film and may have a layered structure of a plurality of metal oxide films. In a semiconductor film in which first to third metal oxide films are stacked sequentially, for example, each of the first and third metal oxide films is an oxide film that contains at least one of metal elements contained in the second metal oxide film and in which energy at the bottom of the conduction band is closer to the vacuum level than that in the second metal oxide film by higher than or equal to 0.05 eV, 0.07 eV, 0.1 eV, or 0.15 eV and lower than or equal to 2 eV, 1 eV, 0.5 eV, or 0.4 eV. The second metal oxide film preferably contains at least indium because carrier mobility is increased.

In the transistor including the above oxide semiconductor film, when a voltage is applied to the gate electrode so that an electric field is applied to the semiconductor film, a channel region is formed in the second metal oxide film whose lowest conduction band energy is small in the semiconductor film. That is, since the third metal oxide film is provided between the second metal oxide film and the gate insulating film, a channel region can be formed in the second metal oxide film which is insulated from the gate insulating film.

Since the third metal oxide film contains at least one of the metal elements contained in the second metal oxide film, interface scattering hardly occurs at an interface between the second metal oxide film and the third metal oxide film. Thus, carriers are not easily inhibited from moving at the interface, which results in an increase in field-effect mobility of the transistor.

When an interface state is formed at an interface between the second metal oxide film and the first metal oxide film, a channel region is also formed in a region close to the interface; thus, the threshold voltage of the transistor varies. However, since the first metal oxide film contains at least one of the metal elements contained in the second metal oxide film, an interface state is hardly formed at the interface between the second metal oxide film and the first metal oxide film. As a result, such a structure can reduce variations in transistor electrical characteristics (e.g., threshold voltage).

The plurality of oxide semiconductor films are preferably stacked so that impurities between the metal oxide films do not form an interface state that inhibits carriers from moving at an interface of each film. If impurities exist between the plurality of stacked metal oxide films, the continuity of energy at the bottom of the conduction band between the metal oxide films is lost, and carriers are trapped or lost due to recombination around the interface. A continuous bond (especially, a bond having a U-shaped and well-shaped structure where energy at the bottom of the conduction band is continuously changed between the films) is more likely to be formed in the plurality of metal oxide films containing at least one metal element (main component) in which impurities between the films are reduced than in the plurality of metal oxide films that contain at least one metal element (main component) and are simply stacked.

In order to form such a continuous bond, it is necessary to form films continuously without being exposed to the atmosphere with the use of a multi-chamber deposition apparatus (sputtering apparatus) including a load lock chamber. Each chamber of the sputtering apparatus is preferably evacuated to a high vacuum (to about $5\times10^{-7}$ to $1\times10^{-4}$ Pa) by an adsorption vacuum pump such as a cryopump so that water and the like, which are impurities for an oxide semiconductor, are removed as much as possible. Alternatively, a turbo molecular pump and a cold trap are preferably used in combination to prevent backflow of gas into the chamber through an evacuation system.

To obtain a highly-purified intrinsic oxide semiconductor, not only high vacuum evacuation of the chambers but also high purification of a sputtering gas is important. An oxygen gas or an argon gas used as the gas is highly purified to have a dew point of −40° C. or lower, preferably −80° C. or lower, more preferably −100° C. or lower, so that entry of moisture or the like into the oxide semiconductor film can be prevented as much as possible.

The first or third metal oxide film may be, for example, an oxide film containing aluminum, silicon, titanium, gallium, germanium, yttrium, zirconium, tin, lanthanum, cerium, or hafnium at a higher atomic ratio than the second metal oxide film. Specifically, an oxide film containing the above element at an atomic ratio 1.5 or more times, preferably 2 or more times, more preferably 3 or more times that in the second metal oxide film is preferably used as the first or third metal oxide film. The above element is strongly bonded to oxygen, and thus has a function of inhibiting generation of oxygen vacancies in the oxide film. Accordingly, with such a structure, the first or third metal oxide film can be an oxide film in which oxygen vacancies are less likely to be generated than in the second metal oxide film.

Specifically, in the case where the second metal oxide film and the first or third metal oxide film include an In-M-Zn-based oxide, if the atomic ratio of the first or third metal oxide film is In:M:Zn=$x_1$:$y_1$:$z_1$ and the atomic ratio of the second metal oxide film is In:M:Zn=$x_2$:$y_2$:$z_2$, the atomic ratios may be set so that $y_1/x_1$ is larger than $y_2/x_2$. Note that the element M is a metal element whose bonding strength to oxygen is larger than that of In, and can be Al, Ti, Ga, Y, Zr, Sn, La, Ce, Nd, or Hf, for example. Preferably, the atomic ratios may be set so that $y_1/x_1$ is 1.5 or more times $y_2/x_2$. More preferably, the atomic ratios may be set so that $y_1/x_1$ is 2 or more times $y_2/x_2$. Still more preferably, the atomic ratios may be set so that $y_1/x_1$ is 3 or more times $y_2/x_2$. In the second metal oxide film, $y_2$ is preferably larger than or equal to $x_2$ because the transistor can have stable electrical characteristics. Note that $y_2$ is preferably less than 3 times $x_2$ because the field-effect mobility of the transistor is lowered if $y_2$ is 3 or more times $x_2$.

The first metal oxide film and the third metal oxide film each have a thickness of 3 to 100 nm, preferably 3 to 50 nm. The second metal oxide film has a thickness of 3 to 200 nm, preferably 3 to 100 nm, and more preferably 3 to 50 nm.

The three oxide semiconductor films (first to third metal oxide films) can be either amorphous or crystalline. Note that the second metal oxide film in which a channel region is formed is preferably crystalline because the transistor can have stable electrical characteristics.

Note that a channel formation region means a region of a semiconductor film of a transistor that overlaps a gate electrode and is between a source electrode and a drain electrode. Furthermore, a channel region means a region through which current mainly flows in the channel formation region.

For example, in the case where an In—Ga—Zn-based oxide film formed by sputtering is used as each of the first and third metal oxide films, a target of an In—Ga—Zn-based oxide (In:Ga:Zn=1:3:2 [atomic ratio]) can be used for deposition of the first and third metal oxide films. The deposition conditions can be, for example, as follows: an argon gas (flow rate: 30 sccm) and an oxygen gas (flow rate: 15 sccm) are used as a deposition gas; pressure is 0.4 Pa; substrate temperature is 200° C.; and DC power is 0.5 kW.

In the case where the second metal oxide film is a CAAC-OS film, a target containing a polycrystalline In—Ga—Zn-based oxide (In:Ga:Zn=1:1:1 [atomic ratio]) is preferably used for the deposition. The deposition conditions can be, for example, as follows: an argon gas (flow rate: 30 sccm) and an oxygen gas (flow rate: 15 sccm) are used as a deposition gas; pressure is 0.4 Pa; substrate temperature is 300° C.; and DC power is 0.5 kW.

Note that the transistor may have a structure where the end portion of the semiconductor film is steep or a structure where the end portion of the semiconductor film is rounded.

Also in the case where a semiconductor film including stacked metal oxide films is used in the transistor, regions that are in contact with the source electrode and the drain electrode may have n-type conductivity. With such a structure, the mobility and on-state current of the transistor can be increased, so that a semiconductor device including the transistor can operate at high speed. Furthermore, in the case where the semiconductor film including the stacked metal oxide films is used in the transistor, the regions having n-type conductivity preferably extend to the second metal oxide film serving as a channel region in order that the mobility and on-state current of the transistor can be further increased and the semiconductor device can operate at higher speed.

Note that this embodiment can be combined with any of the other embodiments in this specification as appropriate.

(Embodiment 7)

In this embodiment, electronic devices each including an imaging panel with a display function according to one embodiment of the present invention are described with reference to FIGS. 10A to 10E.

The electronic device according to one embodiment of the present invention includes the imaging panel with a display function according to one embodiment of the present invention in a display area and can display an image on the display area. For example, video data broadcasted or distributed or video data stored in a data storage medium can be displayed. In addition, data processed by a data processor can be displayed. Furthermore, an image used for operation of a control panel or the like can be displayed.

Examples of an electronic device displaying video data include a television device and a digital photo frame.

Examples of the data processor include a computer, a digital camera, a digital video camera, and a portable information terminal.

Other examples of an electronic device include control panels of a watch, a cellular phone, a portable game machine, a large game machine (e.g., a pachinko machine), and an audio reproducing device.

<Television Device>

Figure 10A:
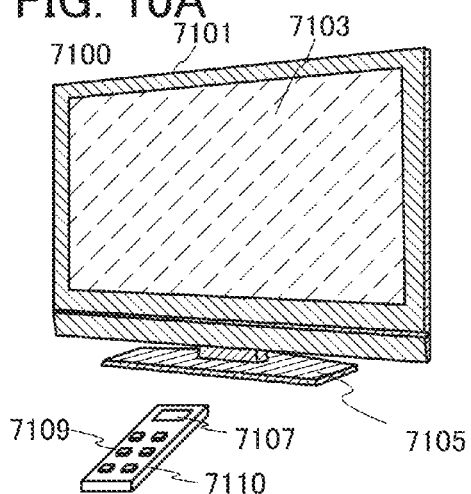
FIGS. 10A to 10E each illustrate an electronic device according to an embodiment.

A television device 7100 includes a display area 7103 incorporated in a housing 7101 supported by a stand 7105 (see FIG. 10A). The television device 7100 further includes the imaging panel with a display function according to one embodiment of the present invention in the display area 7103.

A remote control 7110 can control the television device 7100. For example, video data displayed on the display area 7103 can be switched, and volume can be adjusted.

The remote control 7110 includes a data input/output panel 7107, an operation key 7109, and the like.

The display area 7103 can display a broadcast program received by a receiver or an image supplied from a modem.

The television device 7100 may be connected to the Internet to perform two-way (e.g., between a sender and a receiver or between receivers) communication of data.

<Data Processor>

Figure 10B:
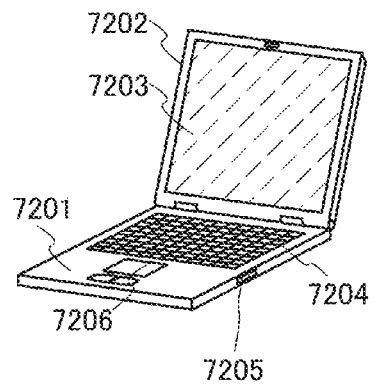

FIG. 10B illustrates a computer as an example of the data processor. The computer includes a main body 7201, a housing 7202, a display area 7203, a keyboard 7204, an external connection port 7205, a pointing device 7206, and the like. The computer further includes the imaging panel with a display function according to one embodiment of the present invention in the display area 7203, and the imaging panel with a display function can display an image and input data.

<Game Machine>

Figure 10C:
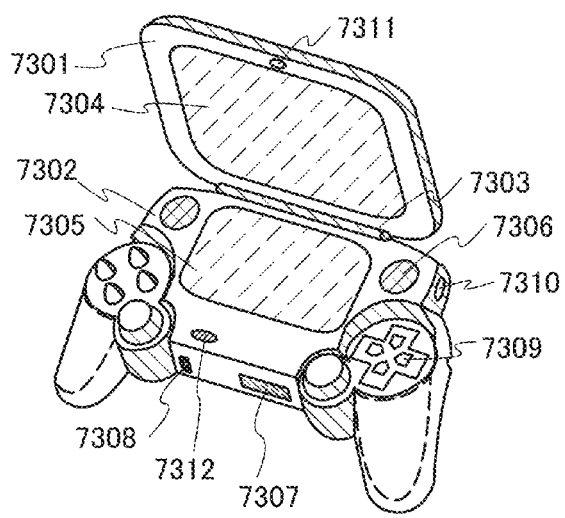

FIG. 10C illustrates an example of a portable game machine. The portable game machine includes two housings, a housing 7301 and a housing 7302, which are joined to each other by a hinge 7303 so that the portable game machine can be opened or folded. A first display area 7304 is incorporated in the housing 7301, and a second display area 7305 is incorporated in the housing 7302. The portable game machine further includes the imaging panel with a display function according to one embodiment of the present invention in each of the first display area 7304 and the second display area 7305, and the imaging panel with a display function can display an image and input data.

In addition, the portable game machine includes a speaker portion 7306, a recording medium insertion portion 7307, an LED lamp 7308, an input means (an operation key 7309, a connection terminal 7310, a sensor 7311 (a sensor having a function of measuring force, displacement, position, speed, acceleration, angular velocity, rotational frequency, distance, light such as infrared light, liquid, magnetism, temperature, chemical substance, sound, time, hardness, electric field, current, voltage, power, radiation, flow rate, humidity, gradient, oscillation, or odor), or a microphone 7312), and the like.

The portable game machine has a function of reading a program or data stored in a recording medium to display it on the first display area 7304 and the second display area 7305, and a function of sharing data with another portable game machine by wireless communication.

<Cellular Phone>

Figure 10D:
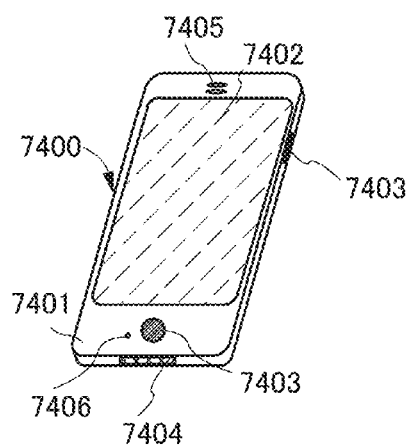

FIG. 10D illustrates an example of a cellular phone. A cellular phone 7400 is provided with a display area 7402 incorporated in a housing 7401, an operation button 7403, an external connection port 7404, a speaker 7405, a microphone 7406, and the like. The cellular phone 7400 further includes the imaging panel with a display function according to one embodiment of the present invention in the display area 7402 and, the imaging panel with a display function can display an image and input data.

The display area 7402 includes a proximity sensor. Data can be input when a finger or the like touches or approaches the display area 7402.

When a sensing device including a sensor such as a gyroscope or an accelerometer for detecting inclination is provided, display on the screen of the display area 7402 can be automatically changed by determining the orientation of the cellular phone 7400 (whether the cellular phone 7400 is placed horizontally or vertically).

The display area 7402 can function as a two-dimensional image sensor. In that case, images of a palm print and a fingerprint of a hand that touches the display area 7402, images of a palm vein and a finger vein that can be taken using a backlight or a sensing light source emitting near-infrared light, and the like can be used for personal authentication, for example.

<Portable Information Terminal>

Figure 10E:
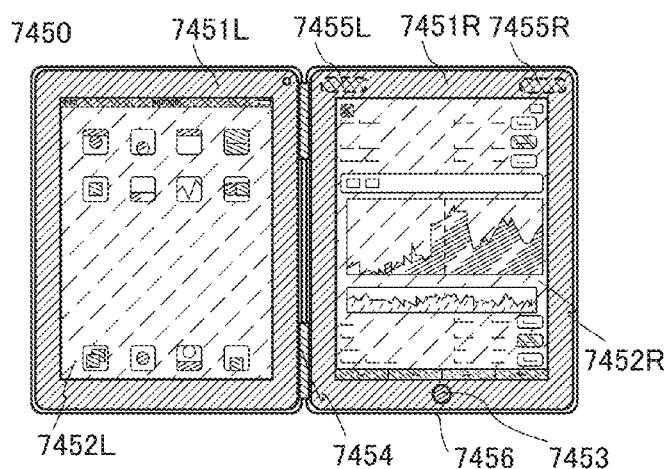

FIG. 10E illustrates an example of a foldable portable information terminal. A portable information terminal 7450 includes a housing 7451L and a housing 7451R connected to each other by hinges 7454. The portable information terminal 7450 further includes an operation button 7453, a left speaker 7455L, and a right speaker 7455R. In addition, a side surface of the portable information terminal 7450 is provided with an external connection port 7456 (not illustrated). Note that when the portable information terminal 7450 is folded on the hinges 7454 so that a display area 7452L provided in the housing 7451L and a display area 7452R provided in the housing 7451R can face each other, the two display areas can be protected by the housings. The portable information terminal 7450 further includes the imaging panel with a display function according to one embodiment of the present invention in each of the display area 7452L and the display area 7452R, and the imaging panel with a display function can display an image and input data.

The portable information terminal 7450 can further include a gyroscope, an accelerometer, a global positioning system (GPS) receiver, or a video camera. For example, when a sensing device including a sensor such as a gyroscope or an accelerometer for detecting inclination is provided, the orientation of the display screen can be automatically changed by determining the orientation of the portable information terminal 7450 (whether the portable information terminal 7450 is placed horizontally or vertically).

Furthermore, the portable information terminal 7450 can be connected to a network. The portable information terminal 7450 not only can display data on the Internet but also can be used as a terminal that controls another electronic device connected to the network from a distant place.

Note that this embodiment can be combined with any of the other embodiments in this specification as appropriate.

(Embodiment 8)

In this embodiment, the structure of the imaging panel with a display function in Embodiment 3 is described with reference to FIGS. 13A to 13C. In particular, in this embodiment, an imaging panel with a display function and flexibility is described.

Figure 13A:
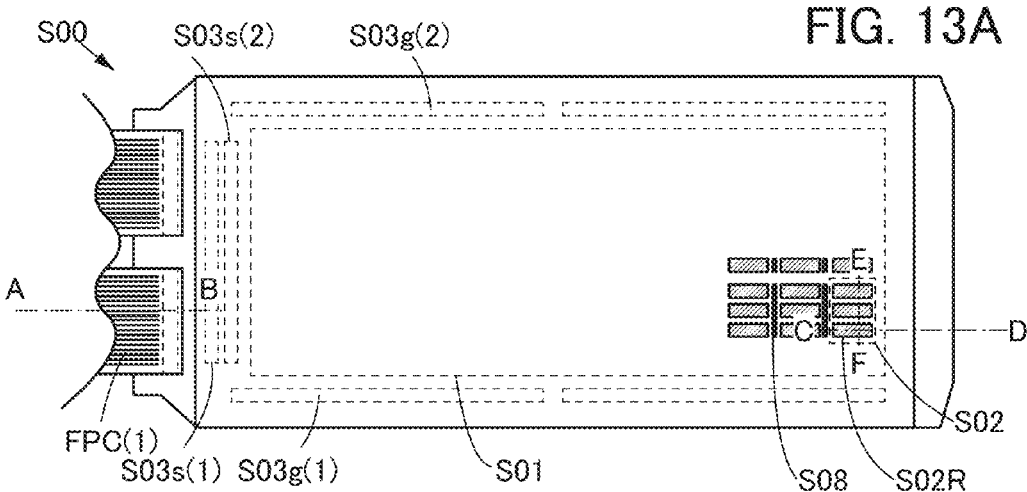
FIGS. 13A to 13C illustrate a structure of an imaging panel with a display function and flexibility according to an embodiment.

FIG. 13A is a top view illustrating the structure of an input/output device that can be used in a data processor according to one embodiment of the present invention.

Figure 13B:
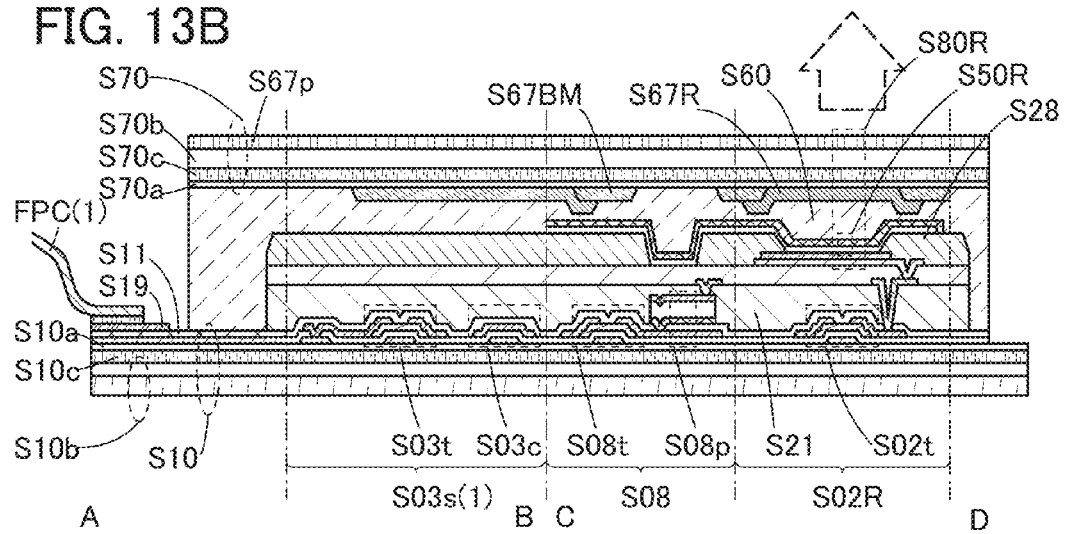

FIG. 13B is a cross-sectional view taken along section line A-B and section line C-D in FIG. 13A.

Figure 13C:
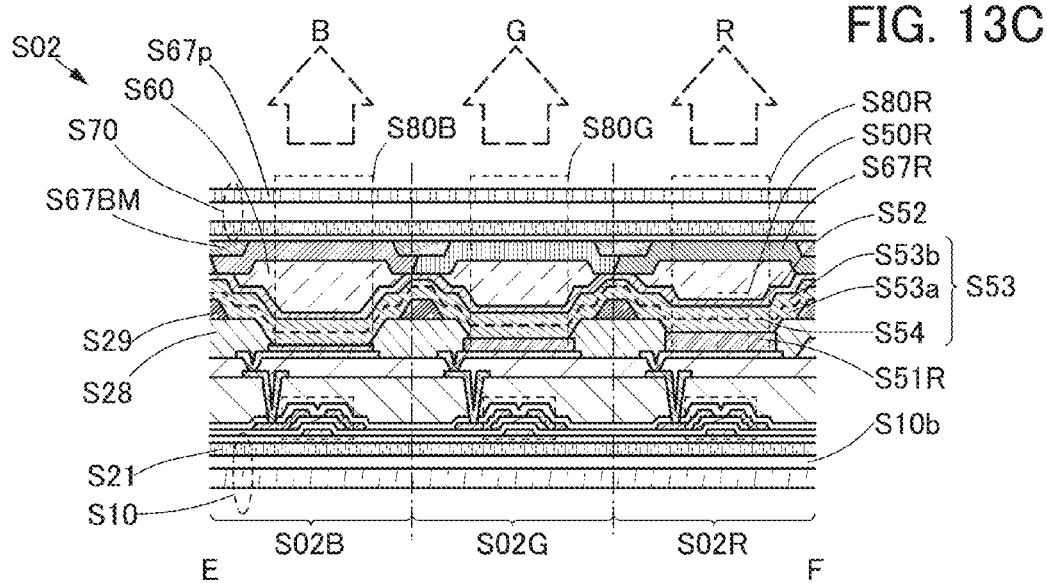

FIG. 13C is a cross-sectional view taken along section line E-F in FIG. 13A.

<Top View>

An input/output device S00 illustrated in this embodiment includes a display area S01 (see FIG. 13A).

The display area S01 includes a plurality of pixels S02 and a plurality of imaging pixels S08. The imaging pixels S08 can sense a touch of a finger or the like on the display area S01. Thus, a touch sensor can be formed using the imaging pixels S08.

Each of the pixels S02 includes a plurality of subpixels (e.g., a subpixel S02R). The subpixel includes a light-emitting element and a pixel circuit that can supply power for driving the light-emitting element.

The pixel circuit is electrically connected to a wiring through which a selection signal can be supplied and a wiring through which an image signal can be supplied.

The input/output device S00 further includes a scan line driver circuit S03g(1) that can supply a selection signal to the pixel S02 and an image signal line driver circuit S03s(1) that can supply an image signal to the pixel S02.

The imaging pixel S08 includes a photoelectric conversion element and an imaging pixel circuit that drives the photoelectric conversion element.

The imaging pixel circuit is electrically connected to a wiring through which a control signal can be supplied and a wiring through which a power supply potential can be supplied.

Examples of the control signal include a signal for selecting an imaging pixel circuit from which a recorded imaging signal is read, a signal for initializing an imaging pixel circuit, and a signal for determining the time it takes for an imaging pixel circuit to sense light.

The input/output device S00 includes an imaging pixel driver circuit S03g(2) that can supply a control signal to the imaging pixel S08 and an imaging signal line driver circuit S03s(2) that reads an imaging signal.

<Cross-sectional View>

The input/output device S00 includes a substrate S10 and a counter substrate S70 facing the substrate S10 (see FIG. 13B).

The substrate S10 is a stacked body including a flexible substrate S10b, a barrier film S10a that prevents diffusion of an unintentional impurity to the light-emitting element, and an adhesive layer S10c that attaches the substrate S10b to the barrier film S10a.

The counter substrate S70 is a stacked body including a flexible substrate S70b, a barrier film S70a that prevents diffusion of an unintentional impurity to the light-emitting element, and an adhesive layer S70c that attaches the substrate S70b to the barrier film S70a (see FIG. 13B).

A sealant S60 attaches the counter substrate S70 to the substrate S10. The sealant S60 has a refractive index higher than that of air serves as an optical adhesive layer. The pixel circuit and the light-emitting element (e.g., a light-emitting element S50R) are provided between the substrate S10 and the counter substrate S70.

<Pixel Structure>

The pixel S02 includes a subpixel S02R, a subpixel S02G, and a subpixel S02B (see FIG. 13C). The subpixel S02R includes a light-emitting module S80R. The subpixel S02G includes a light-emitting module S80G. The subpixel S02B includes a light-emitting module S80B.

For example, the subpixel S02R includes the light-emitting element S50R and a pixel circuit that can supply power to the light-emitting element S50R and includes a transistor S02t (see FIG. 13B). Furthermore, the light-emitting module S80R includes the light-emitting element S50R and an optical element (e.g., a coloring layer S67R).

The light-emitting element S50R includes a lower electrode S51R, an upper electrode S52, and a layer S53 containing a light-emitting organic compound between the lower electrode S51R and the upper electrode S52 (see FIG. 13C).

The layer S53 containing a light-emitting organic compound includes a light-emitting unit S53a, a light-emitting unit S53b, and an intermediate layer S54 between the light-emitting units S53a and S53b.

The light-emitting module S80R includes the coloring layer S67R on the counter substrate S70. The coloring layer transmits light of a specific wavelength and is, for example, a layer that selectively transmits light of red, green, or blue. Alternatively, a region that transmits light emitted from the light-emitting element as it is may be provided.

The light-emitting module S80R, for example, includes the sealant S60 that is in contact with the light-emitting element S50R and the coloring layer S67R.

The coloring layer S67R overlaps the light-emitting element S50R. Accordingly, part of light emitted from the light-emitting element S50R passes through the sealant S60 serving as an optical adhesive layer and through the coloring layer S67R and is emitted to the outside of the light-emitting module S80R as indicated by arrows in FIGS. 13B and 13C.

<Display Panel Structure>

The input/output device S00 includes a light-blocking layer S67BM on the counter substrate S70. The light-blocking layer S67BM is provided to surround the coloring layer (e.g., the coloring layer S67R).

The input/output device S00 includes an anti-reflective layer S67p overlapping the display area S01. As the anti-reflective layer S67p, a circular polarizing plate can be used, for example.

The input/output device S00 includes an insulating film S21. The insulating film S21 covers the transistor S02t. Note that the insulating film S21 can be used as a layer for flattening unevenness caused by the pixel circuit. An insulating film on which a layer that can prevent diffusion of an impurity to the transistor S02t and the like is stacked can be used as the insulating film S21.

The input/output device S00 includes the light-emitting element (e.g., the light-emitting element S50R) over the insulating film S21.

The input/output device S00 includes, over the insulating film S21, a partition S28 that overlaps an end portion of the lower electrode S51R (see FIG. 13C). In addition, a spacer S29 that controls the distance between the substrate S10 and the counter substrate S70 is provided on the partition S28.

<Structure of Image Signal Line Driver Circuit>

The image signal line driver circuit S03s(1) includes a transistor S03t and a capacitor S03c. Note that the driver circuit can be formed through the same steps and over the same substrate as the pixel circuit.

<Imaging Pixel Structure>

The imaging pixel S08 includes a photoelectric conversion element S08p and an imaging pixel circuit for sensing light received by the photoelectric conversion element S08p. The imaging pixel circuit includes a transistor S08t.

For example, a PIN photodiode can be used as the photoelectric conversion element S08p.

<Other Structures>

The input/output device S00 includes a wiring S11 through which a signal can be supplied. The wiring S11 is provided with a terminal S19. Note that an FPC(1) through which a signal such as an image signal or a synchronization signal can be supplied is electrically connected to the terminal S19.

Note that a printed wiring board (PWB) may be attached to the FPC(1).

Note that this embodiment can be combined with any of the other embodiments in this specification as appropriate.

(Embodiment 9)

In this embodiment, an example of the imaging panel in Embodiment 8 with a display function and flexibility is described with reference to FIGS. 14A to 14C, FIG. 15, FIG. 16, and FIGS. 17A to 17B-3. Note that the imaging panel with a display function in this embodiment can input positional data on a finger that approaches the imaging panel; thus, the imaging panel can be used as a touch panel.

Figure 14A:
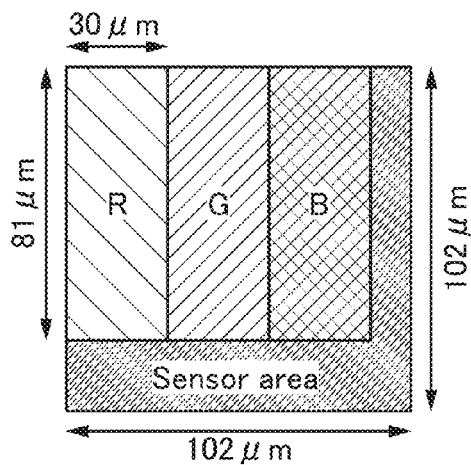
FIGS. 14A to 14C illustrate a structure of an imaging panel with a display function according to an embodiment.
Figure 14B:
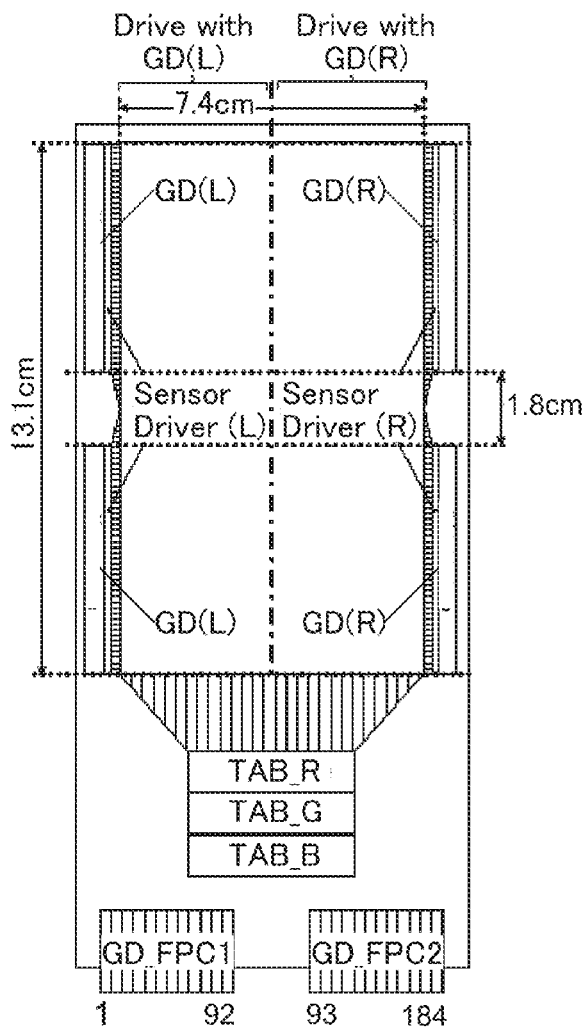
Figure 14C:
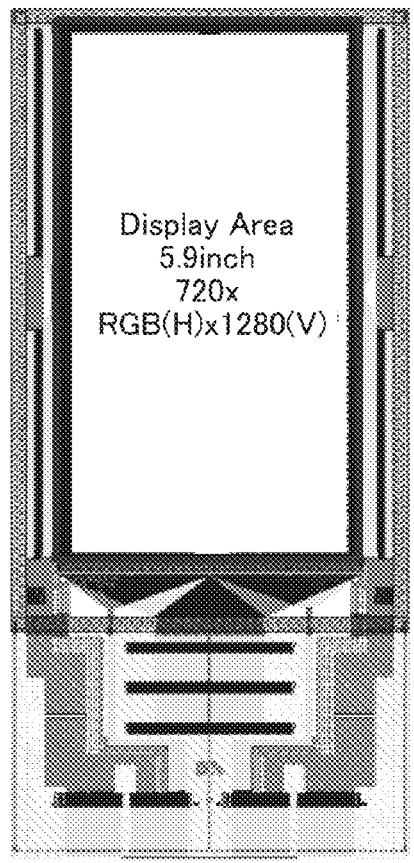

FIGS. 14A to 14C illustrate the imaging panel with a display function. FIG. 14A illustrates the arrangement of an imaging element in an imaging pixel and a display element. FIG. 14B illustrates the arrangement of driver circuits in the imaging panel.

FIG. 14C illustrates the location of a display area of a display panel.

Figure 15:
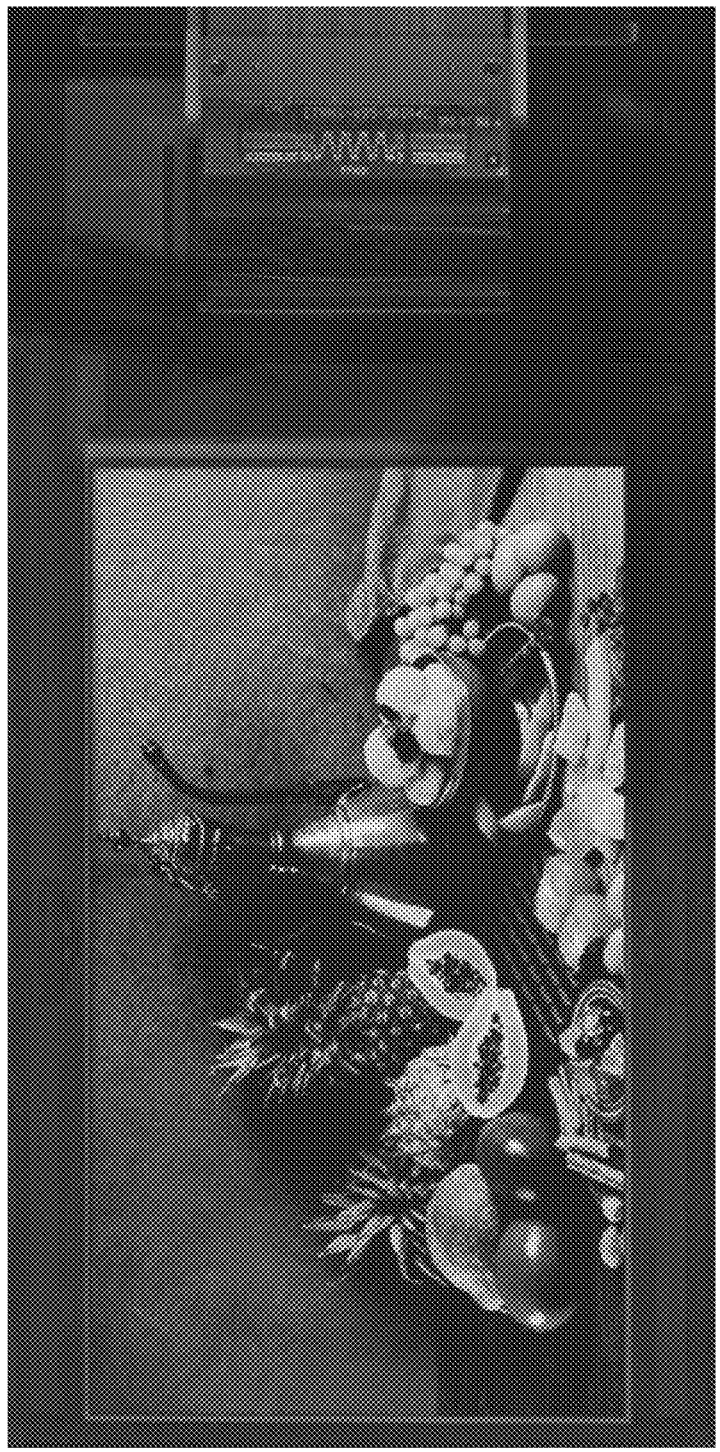
FIG. 15 shows display quality of an imaging panel with a display function according to an embodiment.

FIG. 15 shows the display quality of the imaging panel with a display function.

Figure 16:
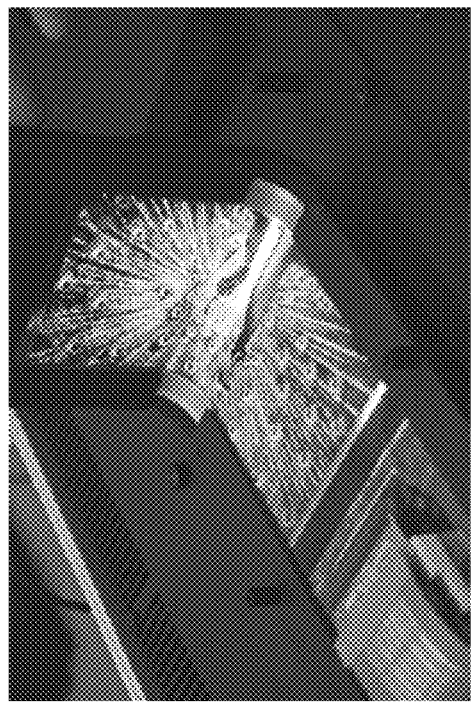
FIG. 16 shows flexibility of an imaging panel with a display function according to an embodiment.
Figure 16:
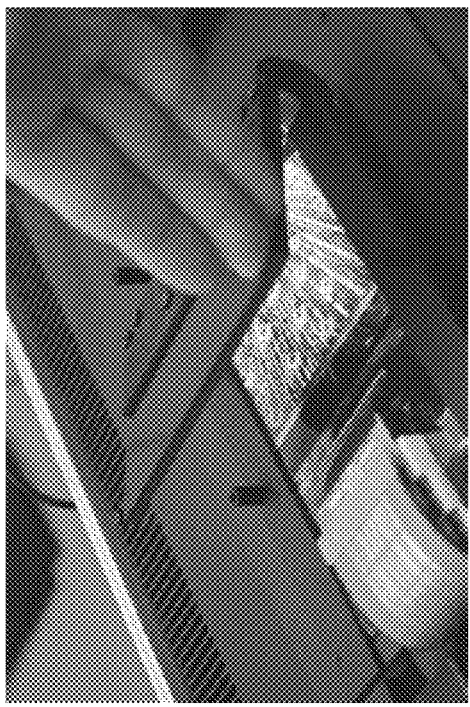
Figure 16:
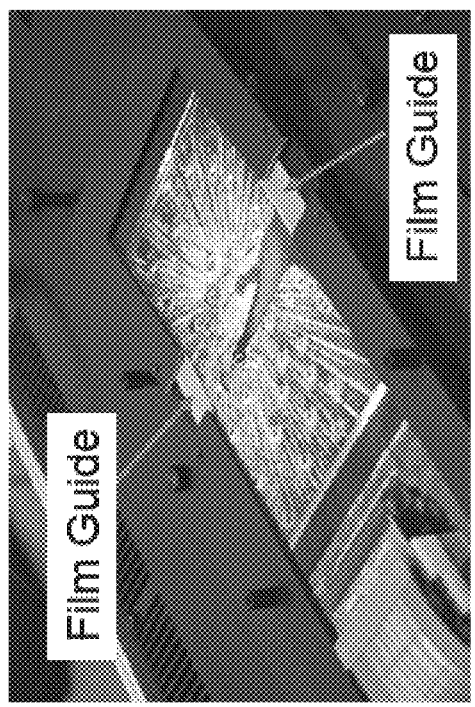
Figure 16:
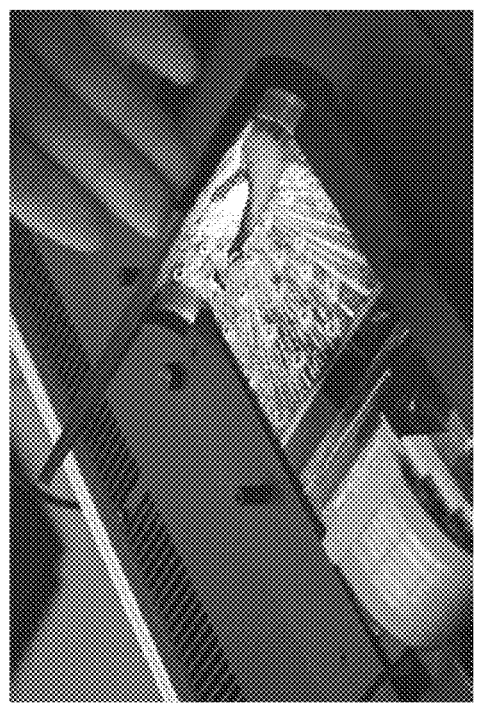
Figure 17A:
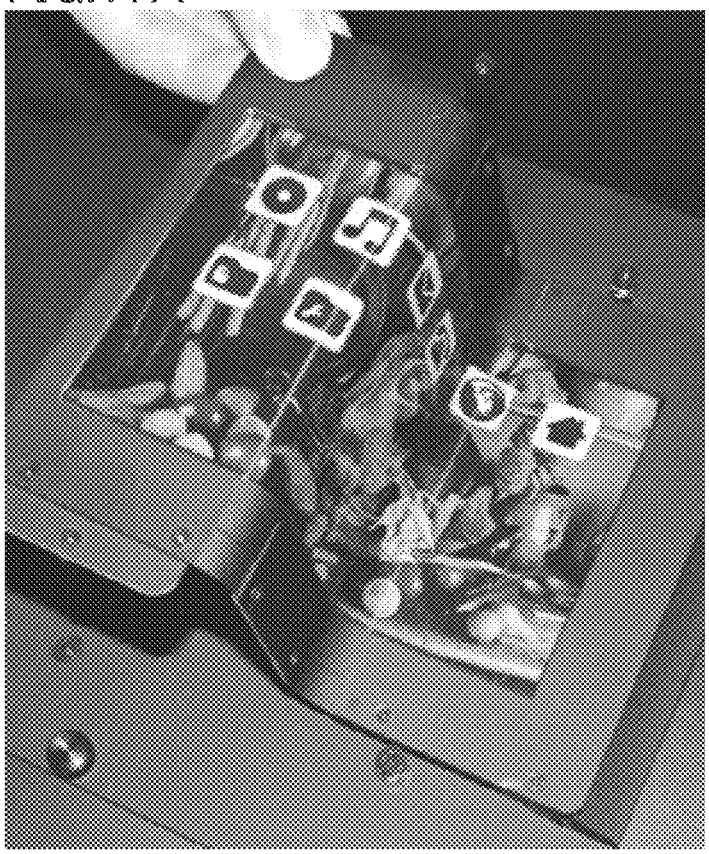
FIGS. 17A to 17B-3 show display quality of an imaging panel with a display function according to an embodiment.
Figures 1, 17B:
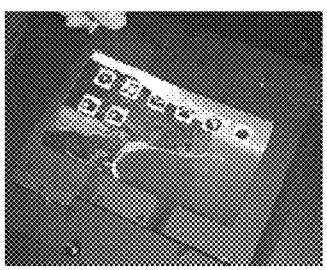
Figures 2, 17B:
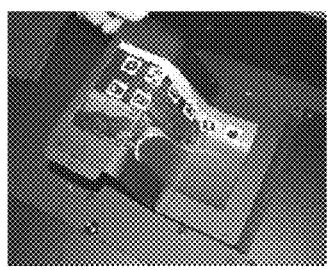
Figures 3, 17B:
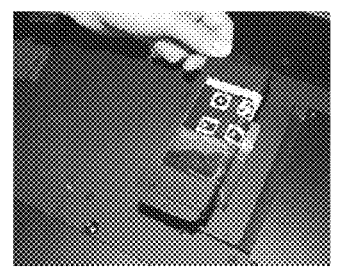

FIG. 16 and FIGS. 17A to 17B-3 show the flexibility of the imaging panel with a display function. FIG. 16 shows the imaging panel with a display function that is folded in half. FIG. 17A shows the appearance of the imaging panel with a display function that can be folded in three parts. FIGS. 17B-1 to 17B-3 show the imaging panel with a display function that is folded in three parts.

<Imaging Panel with Display Function and Flexibility>

Table 1 shows the specification of a display panel of a manufactured imaging panel with a display function, and Table 2 shows the specification of the imaging panel.

TABLE 1

| | |
|---|---|
| Display size | 5.9-inch (portrait) |
| Valid pixels | 720 × RGB (H) × 1280 (V) (HD) |
| Pixel size | 102 µm (H) × 102 µm (V) (subpixel: 30 µm (H) × 81 µm (V)) |
| Outer size | 96.45 mm (H) × 207.5 mm (V) |
| Display area | 73.44 mm (H) × 130.56 mm (V) |
| Pixel density | 249 ppi |
| Display element | OLED (top emission) |
| Color system | White + color filter |
| Aperture ratio | 45.20% |
| Pixel circuit | 5Tr + 1C/cell |
| Video signal | Analog line sequence |
| Scan driver | Integrated |
| Source driver | COF |

TABLE 2

| | |
|---|---|
| Operation | Independent of display |
| Pixel size | (102 µm × 12) (H) × (102 µm × 4) (V) One imaging pixel with 12 × 4 display pixels, not square for future improvement |
| Number of pixels | 60(H) × 160(V) or 60(H) × 320(V) |
| Transistors | 4 CAAC-IGZO transistors/pixel |
| Photodiode | Stacked a-Si pin diode (detecting only visible light) |
| Method for driving | Global shutter mode |
| CMOS sensors | (using low off-state current of CAAC-IGZO) |
| Fill factor | 5% |
| Frame rate | 60 Hz |
| Exposure time | 293 µs |
| Vertical driver | Integrated |
| Horizontal driver | Analog 2-to-1 selector and common-source amplifier |
| Analog output | 30 lines (external ADC) |

The imaging panel with a display function in this embodiment constitutes one imaging pixel by using sensor areas of 48 display pixels (12×4 pixels).

The imaging panel with a display function in this embodiment senses a finger that approaches the imaging panel and can be used as a touch panel. For example, positional data is input when the finger approaches an image for operation, so that the imaging panel can perform operation related to the positional data. Specifically, an image in which a graphic with a darker color than a white ground color is displayed can be used as the image for operation.

In addition, the imaging panel can correct the threshold voltage by using five transistors and one capacitor. Thus, the imaging panel can display images favorably.

Furthermore, the imaging panel can be folded and opened one hundred thousand times without loss of display quality or the like.

Note that this embodiment can be combined with any of the other embodiments in this specification as appropriate.

This application is based on Japanese Patent Application serial No. 2013-106270 filed with Japan Patent Office on May 20, 2013, the entire contents of which are hereby incorporated by reference.

What is claimed is:

1. A semiconductor device comprising:
a first imaging pixel comprising:
a first window, a second window, a third window, and a fourth window, which are arranged in matrix;
a first photoelectric conversion element; and
a first sensor circuit,
wherein each of the first window, the second window, the third window, and the fourth window transmits visible light,
wherein the first photoelectric conversion element is configured to supply a first signal to the first sensor circuit,
wherein the first photoelectric conversion element extends between the first window and the second window, between the first window and the third window, and between the third window and the fourth window, and
wherein the first sensor circuit is between the second window and the fourth window.

2. The semiconductor device according to claim 1, wherein the first photoelectric conversion element has a grid-like formation.

3. The semiconductor device according to claim 1, further comprising a second imaging pixel, the second imaging pixel comprising:
a fifth window, a sixth window, a seventh window, and an eighth window, which are arranged in matrix;
a second photoelectric conversion element; and
a second sensor circuit,
wherein each of the fifth window, the sixth window, the seventh window, and the eighth window transmits visible light,
wherein the second photoelectric conversion element is configured to supply a second signal to the second sensor circuit,
wherein the second sensor circuit is between the fifth window and the seventh window, and
wherein the first sensor circuit and the second sensor circuit are connected to each other in parallel.

4. The semiconductor device according to claim 1, further comprising a read circuit and a second imaging pixel including a second sensor circuit,
wherein the first sensor circuit and the second sensor circuit are configured to supply a first imaging signal and a second imaging signal to the read circuit, respectively, and
wherein the read circuit includes first and second amplifiers amplifying the first and second imaging signals to first and second amplified signals, respectively, and a selection circuit selecting one of the first and second amplified signals.

5. A touch panel including a display panel and the semiconductor device according to claim 1.

6. The semiconductor device according to claim 1, further comprising a display panel,
wherein each of the first window, the second window, the third window, and the fourth window is overlapped with each of a first display pixel, a second display pixel, a third display pixel, and a fourth display pixel of the display panel, respectively.

7. A semiconductor device comprising:
an imaging panel including a first imaging pixel over a display panel, the first imaging pixel comprising:
a first window, a second window, a third window, and a fourth window, which are arranged in matrix;
a first photoelectric conversion element;
a second photoelectric conversion element; and
a first sensor circuit,
wherein each of the first window, the second window, the third window, and the fourth window transmits visible light,
wherein the display panel comprising a first display pixel, a second display pixel, a third display pixel, and a fourth display pixel,
wherein each of the first window, the second window, the third window, and the fourth window is overlapped with each of the first display pixel, the second display pixel, the third display pixel, and the fourth display pixel, respectively,
wherein the first photoelectric conversion element and the second photoelectric conversion element are configured to supply a first signal and a second signal to the first sensor circuit, respectively,
wherein the first photoelectric conversion element extends between the first window and the third window, and
wherein the first sensor circuit is between the second window and the fourth window.

8. The semiconductor device according to claim 7, wherein the first photoelectric conversion element and the second photoelectric conversion element extend along the first window, the second window, the third window, and the fourth window in a row direction, and are connected to each other in parallel.

9. The semiconductor device according to claim 7, further comprising a read circuit and a second imaging pixel including a second sensor circuit,
wherein the first sensor circuit and the second sensor circuit are configured to supply a first imaging signal and a second imaging signal to the read circuit, respectively, and
wherein the read circuit includes first and second amplifiers amplifying the first and second imaging signals to first and second amplified signals, respectively, and a selection circuit selecting one of the first and second amplified signals.

10. A touch panel including the semiconductor device according to claim 7.

11. A semiconductor device comprising:
a first imaging pixel comprising:
a first display pixel, a second display pixel, a third display pixel, and a fourth display pixel, which are arranged in matrix;
a first photoelectric conversion element; and
a first sensor circuit,
wherein the first photoelectric conversion element is configured to supply a first signal to the first sensor circuit,
wherein each of the first display pixel, the second display pixel, the third display pixel, and the fourth display pixel includes a display element and a display pixel circuit configured to supply a second signal to the display element, and
wherein the first photoelectric conversion element extends between the first display pixel and the second display pixel, between the first display pixel and the third display pixel, and between the third display pixel and the fourth display pixel, and
wherein the first sensor circuit is between the second display pixel and the fourth display pixel.

12. The semiconductor device according to claim 11, wherein the first photoelectric conversion element has a grid-like formation.

13. The semiconductor device according to claim 11, further comprising a second imaging pixel, the second imaging pixel comprising:
a fifth display pixel, a sixth display pixel, a seventh display pixel, and an eighth display pixel, which are arranged in matrix;
a second photoelectric conversion element; and
a second sensor circuit,
wherein the second photoelectric conversion element is configured to supply a third signal to the second sensor circuit,
wherein the second sensor circuit is between the fifth display pixel and the seventh display pixel, and
wherein the first sensor circuit and the second sensor circuit are connected to each other in parallel.

14. The semiconductor device according to claim 11, wherein the display element is selected from the group consisting of a liquid crystal element, an organic electroluminescent element, electronic ink, a MEMS shutter display element, and a MEMS optical coherence display element.

15. The semiconductor device according to claim 11, further comprising a read circuit and a second imaging pixel including a second sensor circuit,
wherein the first sensor circuit and the second sensor circuit are configured to supply a first imaging signal and a second imaging signal to the read circuit, respectively, and
wherein the read circuit includes first and second amplifiers amplifying the first and second imaging signals to first and second amplified signals, respectively, and a selection circuit selecting one of the first and second amplified signals.

16. A touch panel including the semiconductor device according to claim 11.

17. The semiconductor device according to claim 11, wherein each of the first display pixel, the second display pixel, the third display pixel, and the fourth display pixel includes three subpixels.

* * * * *